(12) United States Patent
Inui et al.

(10) Patent No.: US 8,582,136 B2
(45) Date of Patent: Nov. 12, 2013

(54) IMAGE PROCESSING APPARATUS, METHOD, AND RECORDING MEDIUM FOR ENSURING THE AUTHENTICITY OF A DOCUMENT

(75) Inventors: Kazuo Inui, Itami (JP); Hiroaki Kubo, Muko (JP); Nobuhiro Mishima, Osaka (JP); Kenji Matsuhara, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 926 days.

(21) Appl. No.: 12/370,267

(22) Filed: Feb. 12, 2009

(65) Prior Publication Data
US 2009/0213410 A1    Aug. 27, 2009

(30) Foreign Application Priority Data

Feb. 22, 2008  (JP) ................................. 2008-042230

(51) Int. Cl.
    G06K 15/02       (2006.01)
(52) U.S. Cl.
    USPC ........................................ 358/1.14; 358/1.15
(58) Field of Classification Search
    USPC ............................................... 358/1.14, 1.15
    See application file for complete search history.

(56) References Cited

U.S. PATENT DOCUMENTS

| | | | |
|---|---|---|---|
| 6,657,753 B2 | 12/2003 | Shiota et al. | |
| 2002/0003879 A1* | 1/2002 | Ibaraki et al. | 380/201 |
| 2005/0069170 A1* | 3/2005 | Alasia et al. | 382/100 |
| 2005/0144469 A1* | 6/2005 | Saitoh | 713/189 |
| 2007/0036470 A1* | 2/2007 | Piersol et al. | 382/306 |
| 2007/0091351 A1 | 4/2007 | Okamoto et al. | |
| 2007/0296997 A1 | 12/2007 | Taneda | |
| 2008/0130035 A1* | 6/2008 | Smith | 358/1.15 |

FOREIGN PATENT DOCUMENTS

| | | |
|---|---|---|
| JP | 11-187247 A | 7/1999 |
| JP | 2003-092729 A | 3/2003 |
| JP | 2007-88986 A | 4/2007 |
| JP | 2007-116588 A | 5/2007 |
| JP | 2008-005283 | 1/2008 |
| JP | 2008-028781 | 2/2008 |

OTHER PUBLICATIONS

A Notification of Reasons for Refusal issued in corresponding Japanese Patent Application No. 2008-042230, mailed Sep. 15, 2009, and English translation thereof.
Notification of Reasons for Refusal issued on May 15, 2012, in corresponding Japanese Patent Application No. 2009-260513, together with an English translation thereof.

* cited by examiner

*Primary Examiner* — Qian Yang
(74) *Attorney, Agent, or Firm* — Buchanan Ingersoll & Rooney PC

(57) ABSTRACT

A detector detects a first key information piece embedded on one side of one sheet or more than one respective sheets from which image data is read out by a reader, and a second key information piece embedded on the other side thereof or on another sheet. And a comparator compares to each other, the detected first and second key information pieces and judges whether or not these key information pieces are related to each other. Then, a controller permits an output portion to output image data read out from all judgment target sheets if it is judged about all these respective sheets that the first and second key information pieces are related to each other, meanwhile the controller prohibits the output portion from outputting image data read out from one sheet if it is judged about this sheet that those key information pieces are not related to each other.

24 Claims, 28 Drawing Sheets

IMAGE PROCESSING APPARATUS, METHOD, AND RECORDING MEDIUM FOR ENSURING THE AUTHENTICITY OF A DOCUMENT

This application claims priority under 35 U.S.C. §119 to Japanese Patent Application No. 2008-042230 filed on Feb. 22, 2008, the entire disclosure of which is incorporated herein by reference in its entirety.

BACKGROUND OF THE INVENTION

1. Field of the Invention

The present invention relates to an image processing apparatus such as a MPF (Multi Function Peripheral) that is a multifunctional digital machine, an image processing method implemented by this image processing apparatus, a computer readable recording medium having an image processing program stored therein to make a computer of the image processing apparatus execute image processing.

2. Description of the Related Art

The following description sets forth the inventor's knowledge of related art and problems therein and should not be construed as an admission of knowledge in the prior art.

With the development of digital circumstances, which is represented by the recent wide spread of personal computers, false documents can be created easier than before. Furthermore, since the copy quality of copiers has been notably improved, there happens a problem for example, that a copy is made from an original document and some of the sheets are replaced with false ones, and the copy including the false sheets is maliciously distributed as an original document. To cope with such a problem, it is required to ensure the authenticity of an original document.

To prevent illegal document copying, there is an art conventionally suggested by Japanese Unexamined Laid-open Patent Publication No. 2007-116588, in which a copy operation is prohibited if a particular image is included in any side of a sheet having images on its both sides.

However, the art disclosed in the publication above is intended only to prohibit a copy operation if a particular image is included in any side of a sheet having images on its both sides, and not intended to check the authenticity of the sheet. Therefore, this art is not effective to prevent a problem, for example, that a false document is maliciously distributed as an original document.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image processing apparatus that is capable of ensuring the authenticity of a document and preventing a problem, for example, that a false document is maliciously distributed as an original document.

It is another objective of the present invention to provide an image processing method that is capable of ensuring the authenticity of a document and preventing a problem, for example, that a false document is maliciously distributed as an original document.

It is yet another objective of the present invention to provide a computer readable recording medium having an image processing program stored therein to make a computer of the image processing apparatus execute image processing by the image processing method.

According to a first aspect of the present invention, an image processing apparatus comprises:

a reader that reads an image on a document;

an output portion that outputs image data read out from the document by the reader;

a detector that detects a first key information piece embedded on one side of one sheet or more than one respective sheets that is the document from which image data is read out by the reader, and a second key information piece to be compared to the first key information piece, which is embedded on the other side thereof or on another sheet of the document;

a comparator that compares to each other the first key information piece and the second key information piece detected by the detector, and judges whether or not the first key information piece and the second key information piece are related to each other; and a controller that permits the output portion to output image data read out from all relativity judgment target sheets of the document, if the comparator judges about all these respective sheets that the first key information piece and the second key information piece are related to each other, and prohibits the output portion from outputting image data read out from at least one sheet of the document, if the comparator judges about this sheet that the first key information piece and the second key information piece are not related to each other.

According to a second aspect of the present invention, an image processing apparatus comprises:

a key information memory that records in itself a plurality of different first key information pieces and a plurality of second key information pieces related to the first key information pieces from one pair to another;

an operation portion; and a printer that prints on one side of one sheet or more than one respective sheets, image data and one of the first key information pieces recorded in the memory, and prints on the other side thereof or on another sheet, one of the second key information pieces, which is related to the first key information piece.

According to a third aspect of the present invention, an image processing method comprises:

reading an image on a document;

outputting image data read out from the document;

detecting a first key information piece embedded on one side of one sheet or more than one respective sheets that is the document and a second key information piece to be compared to the first key information piece, which is embedded on the other side thereof or on another sheet of the document;

comparing to each other, the detected first key information piece and second key information piece, and judging whether or not the first key information piece and the second key information piece are related to each other; and permitting output of image data read out from all relativity judgment target sheets of the document, if it is judged about all these respective sheets that the first key information piece and the second key information piece are related to each other, meanwhile prohibiting output of at least one sheet of the document, if it is judged about this sheet that the first key information piece and the second key information piece are not related to each other.

According to a fourth aspect of the present invention, an image processing method comprises:

recording a plurality of different first key information pieces and a plurality of second key information pieces related to the first key information pieces from one pair to another;

printing on one side of one sheet or more than one respective sheets, image data and one of the recorded first key information pieces, and prints on the other side thereof or on another sheet, one of the second key information pieces, which is related to the first key information piece.

According to a fifth aspect of the present invention, a computer readable recording medium has an image processing program stored therein to make a computer of an image processing apparatus execute:

reading an image on a document;

outputting image data read out from the document;

detecting a first key information piece embedded on one side of one sheet or more than one respective sheets that is the document and a second key information piece to be compared to the first key information piece, which is embedded on the other side thereof or on another sheet of the document;

comparing to each other, the detected first key information piece and second key information piece, and judging whether or not the first key information piece and the second key information piece are related to each other; and permitting output of image data read out from all relativity judgment target sheets of the document, if it is judged about all these respective sheets that the first key information piece and the second key information piece are related to each other, meanwhile prohibiting output of at least one sheet of the document, if it is judged about this sheet that the first key information piece and the second key information piece are not related to each other.

According to a sixth aspect of the present invention, a computer readable recording medium has an image processing program stored therein to make a computer of an image processing apparatus execute:

recording a plurality of different first key information pieces and a plurality of second key information pieces related to the first key information pieces from one pair to another;

printing on one side of one sheet or more than one respective sheets, image data and one of the recorded first key information pieces, and prints on the other side thereof or on another sheet, one of the second key information pieces, which is related to the first key information piece.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
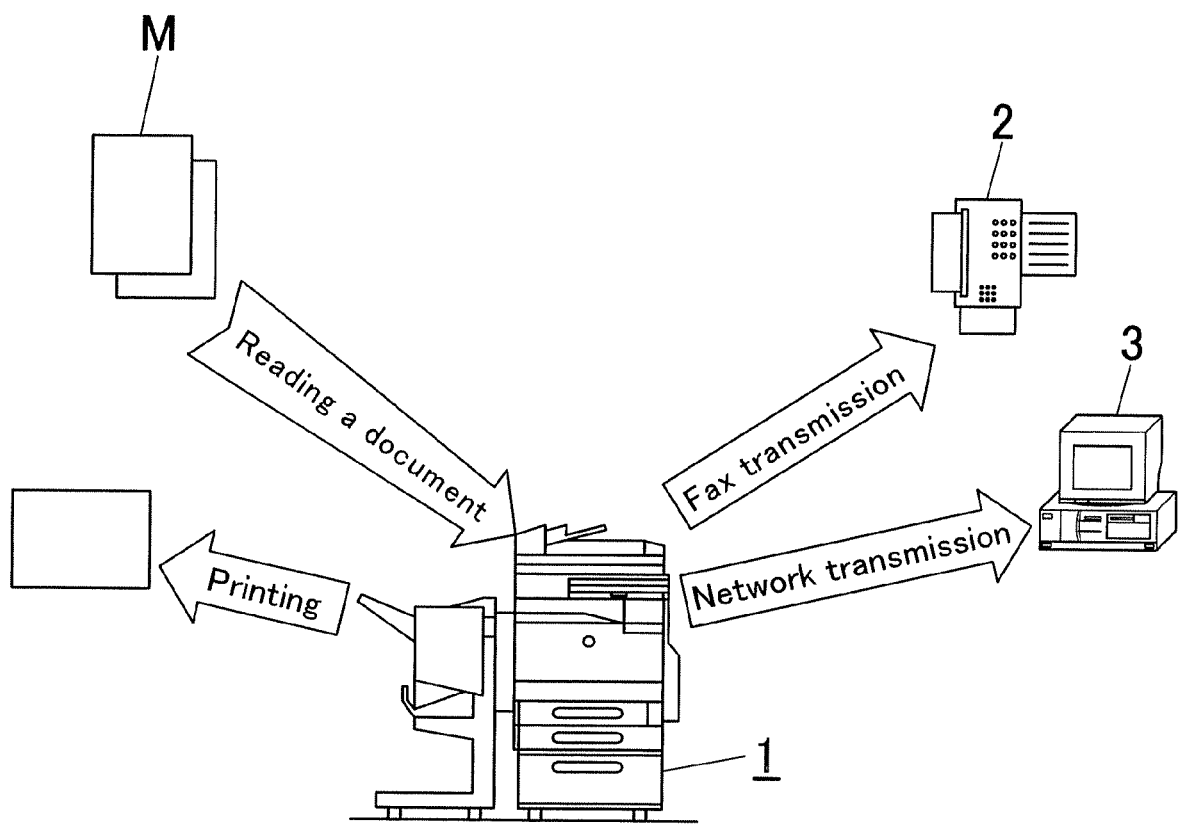
FIG. 1 is a view to explain main functions of an image processing apparatus according to one embodiment of the present invention.

FIG. 1 is a view to explain main functions of an image processing apparatus 1 according to one embodiment of the present invention.

The image processing apparatus shown in FIG. 1 is a MFP that is a multifunctional digital machine as described above, and is capable of reading a document M having one or more than one sheets and performing various output operations. Concretely, the image processing apparatus 1 is capable of printing on a sheet the image data read out from the document; transmitting the image data to an external FAX apparatus via a phone line; and transmitting the image data to an external personal computer 3 via a network.

Figure 2:
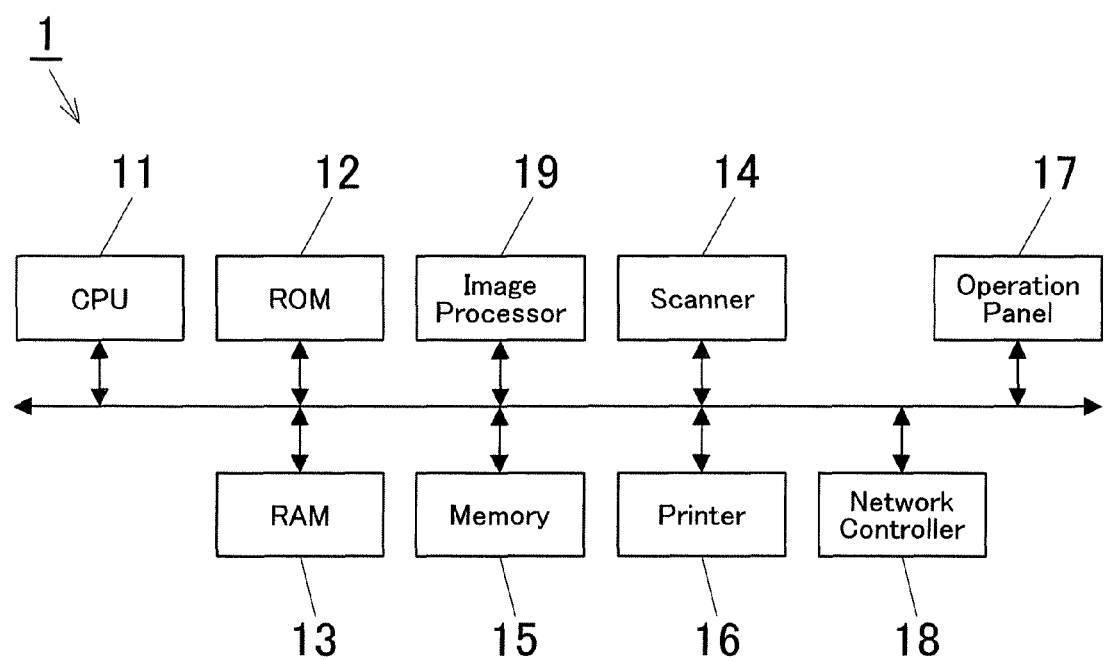
FIG. 2 is a block diagram schematically representing a configuration of the image processing apparatus.

FIG. 2 is a block diagram schematically representing a configuration of the image processing apparatus 1.

The image processing apparatus 1 comprises a CPU 11, a ROM 12, a RAM 13, a scanner 14, a memory 15, a printer 16, an operation panel 17, a network controller (NIC) 18, an image processor 19, and etc.

The CPU 11 centrally controls the entire image processing apparatus 1. Additionally, in this embodiment, the CPU 11 detects a reference key information piece and a comparison key information piece to be compared to the reference key information piece, which are embedded on a document; compares to each other the detected reference key information piece and comparison key information piece; and judges whether or not the reference key information piece and the comparison key information piece are coincident with each other. And based on the judgment result, the CPU 11 performs operations to control the image processing apparatus 1. The control operations will be detailed later.

In this embodiment, it is judged whether or not a reference key information piece and a comparison key information piece are coincident with each other. Alternatively, it can be configured to give a certain relationship to these key information pieces and judge whether or not these key information pieces are related to each other. Furthermore, a ground pattern is a representative example that is employed as a key information piece embedded on a document M. However, a key information piece is not limited to a ground pattern.

The ROM 12 is a memory that stores in itself an operation program executed by the CPU 11.

The RAM 13 is a memory that shares an operation area in which an operation program is executed by the CPU 11.

The scanner 14 reads an image on a document placed on a document table (not shown in Figure) and thereby converts it into image data.

The memory 15 is comprised of a nonvolatile recording device such as a hard disc drive (HDD). This memory 15 records in itself, image data read out from a document by the scanner 14, reference key information pieces and comparison key information pieces detected from a document, judgment results drawn from comparison of these two key information pieces, and etc.

The printer 16 prints out image data read out from a document by the scanner 14, print data received from user terminals and other data, according to a specified mode.

The operation panel 17 is used to perform various entry operations and displays on itself screens, messages and etc. It comprises a key entry portion having numeric keys, a start key and etc., and a display such as a liquid crystal display.

The network controller 18 controls communication with other image processing apparatuses, personal computers that are user terminals, and other external apparatuses on a network.

The image processor 19 converts image data read out from a document by the scanner 14 into digital signals and performs predetermined image processes.

Figure 3:
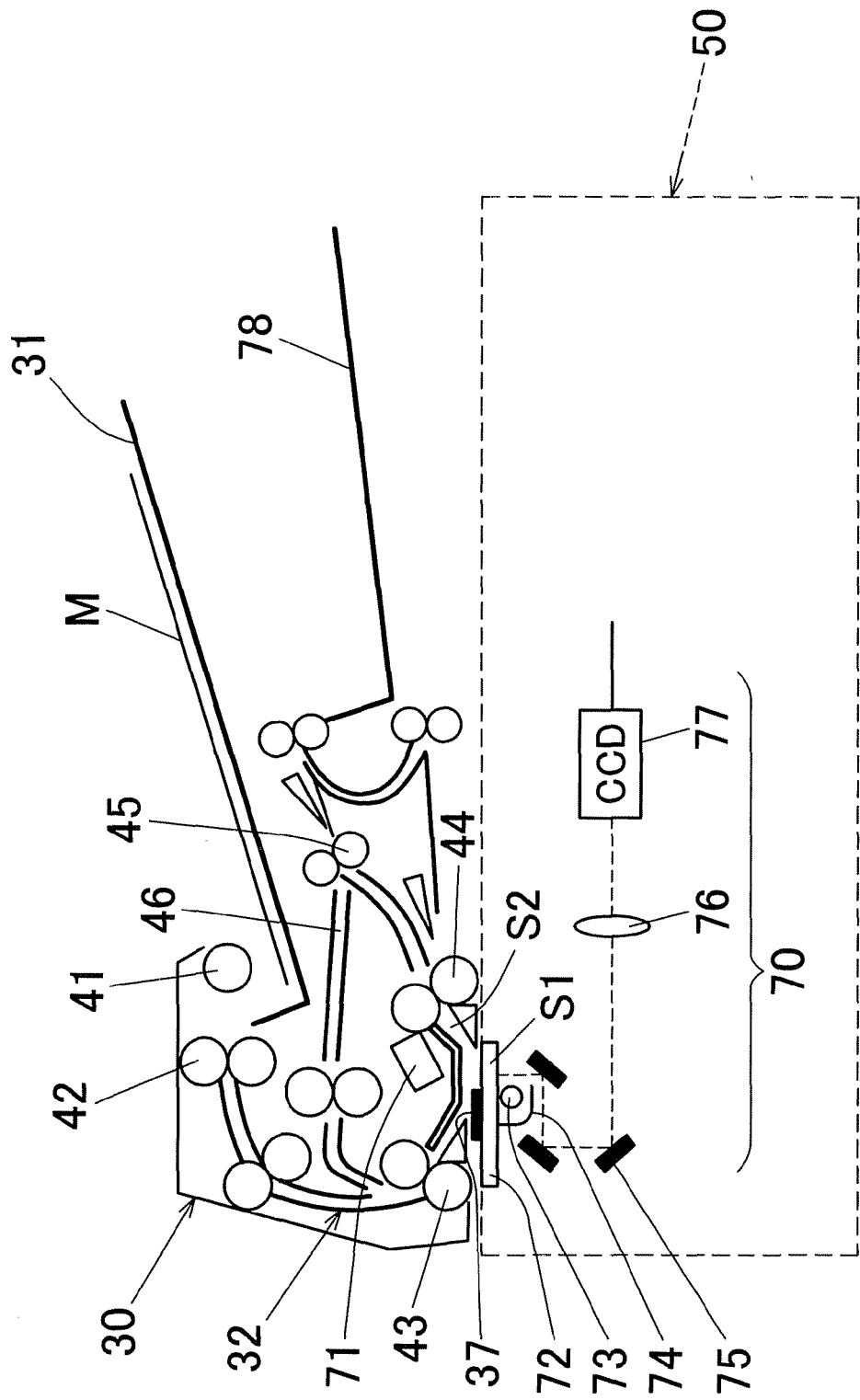
FIG. 3 is a view specifically representing a configuration of a scanner of the image processing apparatus.

FIG. 3 is a view specifically representing a configuration of the scanner 14 of the image processing apparatus 1. This scanner 14 comprises an ADF (Auto Document Feeder) 30 that is a sheet-through type automatic document feeder that reads an image on a sheet of a document while conveying the sheet, and a scanner unit 50.

The ADF 30 comprises a sheet feed tray 31 and a document conveyer 32.

The sheet feed tray 31 has the document M loaded thereon in order to feed one by one.

The document conveyer 32 comprises a sheet feed roller 41 that extracts the document M loaded on the sheet feed tray 31; a separation roller 42 that separates the document M from the sheet feed tray 31; an anterior roller 43 that is located upstream of a first reading area S1; and a posterior roller 44 that is located downstream of the first reading area S1. In addition, the document conveyer 32 comprises a reverse circuit 46 that temporarily discharges the document M after an image on one side of the document M is read; reverses the document M by switching it back by a switch back roller 45; and directs the document M1 reversed upside down, to the first reading area S1.

The sheet feed operation, the conveyance operation and other operations of the ADF 30, are controlled by the CPU 11 (shown in FIG. 2).

A first reader 70 for the first reading area S1 and a second reader 71 for a second reading area S2 located at a brief interval after the first reading area S1, are located across the document conveyance route from each other, in a predetermined position of the document conveyance route.

The scanner unit 50 comprises the first reader 70, and is capable of reading both full-color and black-and-white documents.

The first reader 70 comprises an exposure circuit 73 that exposes to light through a platen glass 72, the document M coming at the first reading area S1; a light reflector 74; a plurality of mirrors 75 that direct to a CCD 77, light reflected from the document M; and a lens 76 located between the mirrors 75 and the CCD 77 that is a line sensor. Furthermore, a conveyance guide portion 37 is located in the first reading area S1 on the platen glass 72, and it guides the document M coming at the first reading area S1 so that it could be conveyed away without touching the platen glass 72.

Analog signals coming from the CCD 77 are converted into digital signals then image-processed in a predetermined manner, by the image processor 19 (shown in FIG. 2).

Figure 4:
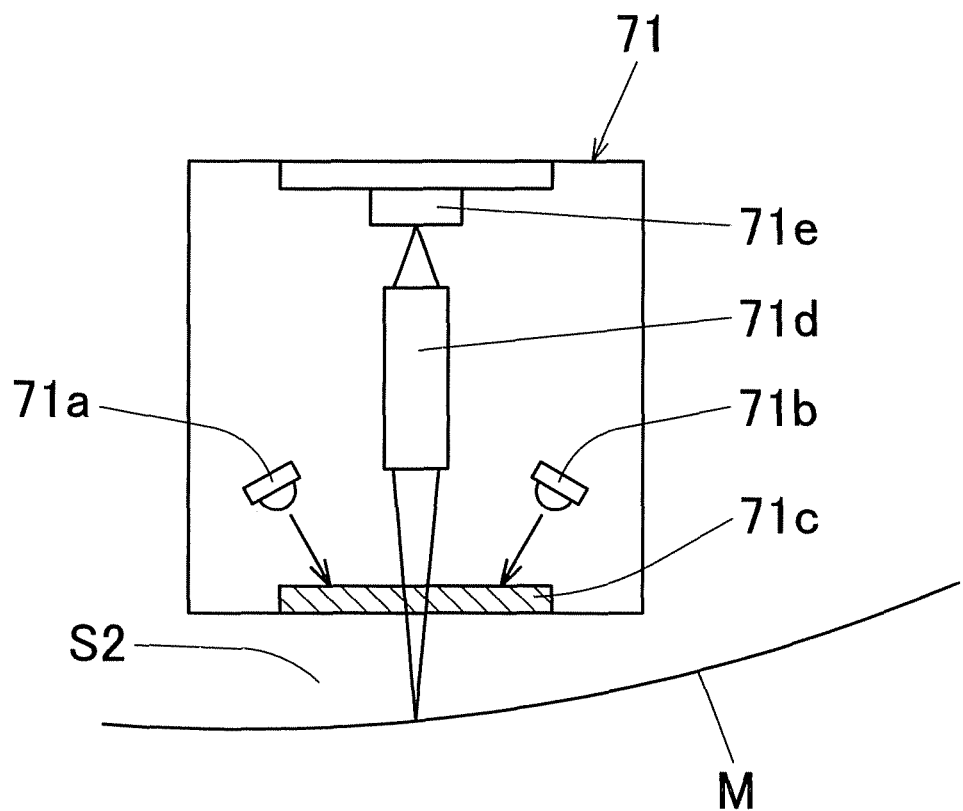
FIG. 4 is a view schematically representing a configuration of a second reader of the scanner.

The second reader 71 provided in the ADF 30 is a contact image sensor (CIS) that is capable of reading both full-color and black-and-white documents, and has the same functions as those of the first reader 70. As shown in FIG. 4, the second reader 71 comprises a pair of LED 71a and 71b that exposes to light through a glass 71c, the document M coming at the second reading area S2; a Selfoc lens 71d that collects light reflected from the document M; and a line sensor 71e that receives the collected light. Here, a CCD is employed as the line sensor 71e. Alternatively, another light receiving element such as a CMOS sensor may be employed.

Analog signals coming from the line sensor 71e that is a CCD are converted into digital signals then image-processed in a predetermined manner, by the image processor 19.

In this scanner 14, the document M loaded on the sheet feed tray 31 is fed by the sheet feed roller 41, then conveyed to the first reading area S1 by the separation roller 42 and the anterior roller 43.

In the scanner unit 50, an image on one side (a front side) of the document M passing through the first reading area S1 is exposed to light by the exposure circuit 73 of the first reader 70, and light reflected from the front side of the document M is received by the CCD 77 through the platen glass 72 and the lens 76. Then image data is generated by the image processor 19 based on RGB data received from the CCD 77.

When the document M passes through the second reading area S2 after the first reading area S1, an image on the other side (a back side) of the document M is read by the second reader 71, then image data is generated accordingly.

After passing through the second reading area S2, the document M is conveyed to the right side of FIG. 1 by the posterior roller 44, and discharged on a discharge tray 78.

As described above, while the document M is conveyed along the conveyance route, from the sheet feed tray 31 until the discharge tray 78, via the first reading area S1 and the second reading area S2, without being switched back to the first reading area, an image on one side of the document M is read by the first reader 70 and an image on the other side thereof is read by the second reader 71. That is, images on both sides of the document M are read at the same time by just one time sheet feeding.

Hereinafter, operations of the image processing apparatus 1 shown in FIGS. 1 through 4, which are performed when the image processing apparatus 1 reads a document having key information pieces embedded thereon, will be explained with reference to FIG. 5 and FIG. 6.

Figure 5:
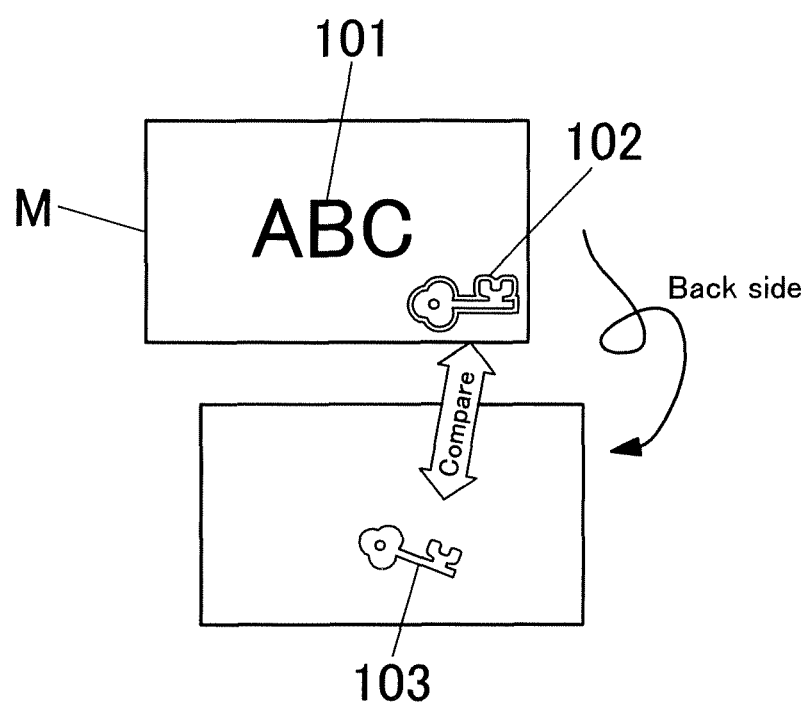
FIG. 5 is a view to explain how to check the authenticity of a document by comparing to each other, a reference key information piece on a back side of a sheet of the document and a comparison key information piece on a front side thereof.

In this example, the authenticity of a document is checked by comparing to each other, a reference key information piece on a back side of a sheet of the document and a comparison key information piece on a front side thereof, and FIG. 5 is a conceptual drawing thereof.

Preliminarily, an image 101 is printed on a front side of the document M and a comparison key information piece 102 is embedded also thereon, meanwhile a reference key information piece 103 is embedded on a back side of the document M. The front and back sides of the document is read at the same time by the scanner 14, and the comparison key information piece 102 and the reference key information piece 103 are detected from image data read out from the document, and then compared to each other. If these two key information pieces are coincident with each other, the authenticity of the document is ensured, thus an output operation is permitted. As for the output operation, the image data read out from the document may be printed on a sheet by the printer 16 and may be transmitted to an external apparatus such as a facsimile terminal or a personal computer. In this example, a print operation is permitted if those two key information pieces are coincident with each other.

If a document consists of more than one sheets, a comparison key information piece and a reference key information piece should be embedded on front and back sides of each of the sheets. In this case, same comparison key information pieces and same reference key information pieces may be used for the respective sheets, and different comparison key information pieces and different reference key information pieces may be used for the respective sheets.

Figure 6:
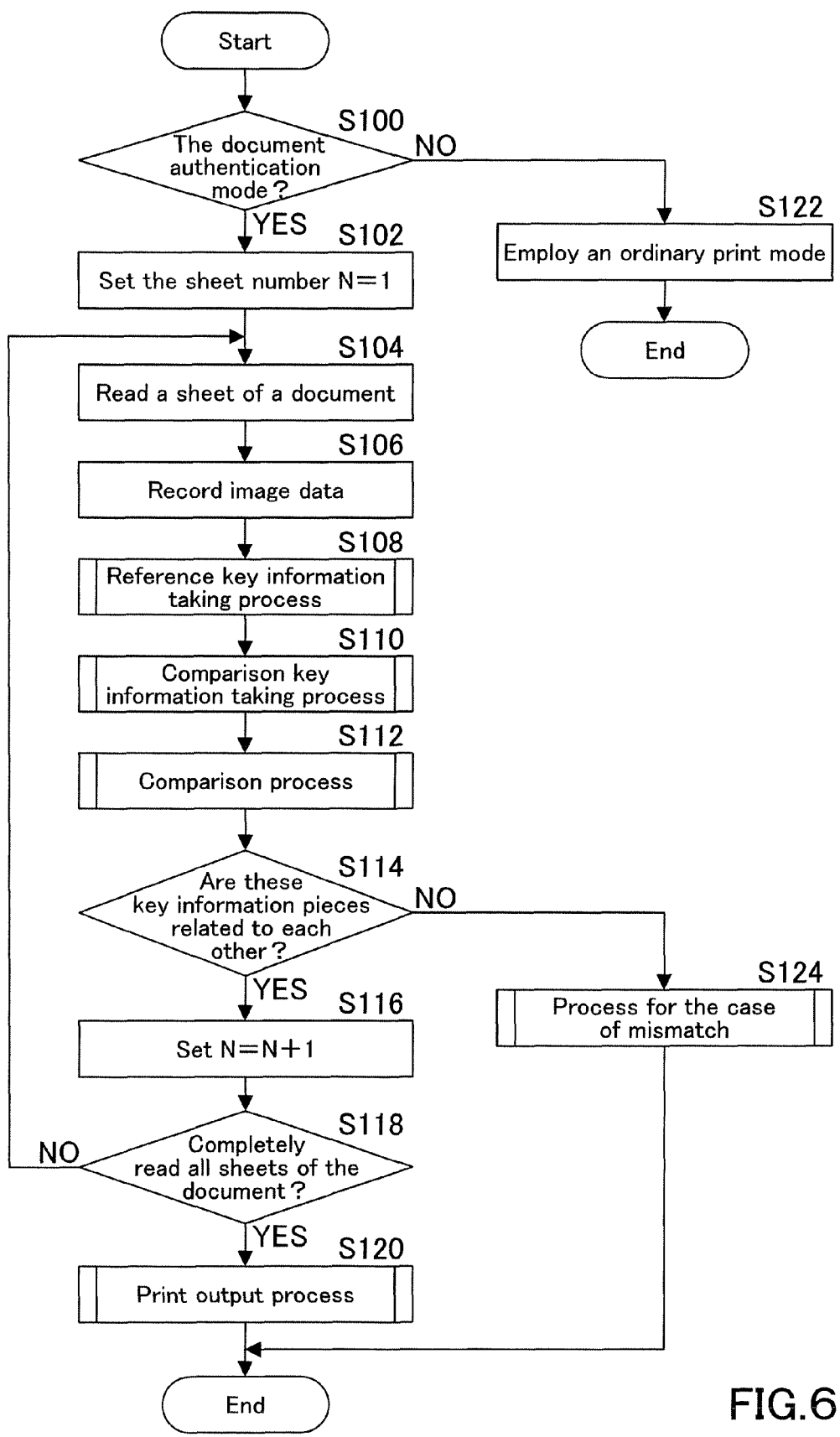
FIG. 6 is a flowchart representing a procedure executed in the image processing apparatus, to check the authenticity of a document by comparing to each other, a reference key information piece on a back side of a sheet of the document and a comparison key information piece on a front side thereof.

FIG. 6 is a flowchart representing a procedure executed in the image processing apparatus, to check the authenticity of a document by comparing to each other, a reference key information piece on a back side of a sheet of the document and a comparison key information piece on a front side thereof, as explained with FIG. 5.

This procedure is executed by the CPU 11 of the image processing apparatus 1 according to a program recorded in a recording medium such as the ROM 12.

Initially, in Step S100, it is judged whether or not the document authentication mode is set on the image processing apparatus 1. The document authentication mode is preliminarily set by user via the operation panel.

If the document authentication mode is not set thereon (NO in Step S100), an ordinary print mode is employed in Step S122. In this case, any reference key information pieces and any comparison key information pieces are not detected and not compared to each other.

If the document authentication mode is set thereon (YES in Step S100), a parameter N indicating the sheet number is set to "1" in Step S102. Then, both sides of a sheet of a document are read at the same time by the scanner 14 in Step S104, and image data read out from the sheet is recorded in the memory 15 or etc. in Step S106.

Subsequently, a reference key information taking process is performed in Step S108, a comparison key information taking process is performed in Step S110, and a comparison process is performed in Step S112. The reference key information taking process, the comparison key information taking process and the comparison process will be further described later.

Then in Step S114, according to the comparison result, it is judged whether or not a reference key information piece and a comparison key information piece are related to each other. If these key information pieces are related to each other (YES in Step S114), "1" is added to the parameter N in Step S116. Then, it is judged in Step S118 whether or not all sheets of a document are completely read.

If all the sheets are not completely read (NO in Step S118), the routine goes back to Step S104 and repeats Steps S104 through S118 about a following sheet of the document. If all the sheets are completely read (YES in Step S118), a print output process is performed in Step S120, then the routine terminates. The print output process will be further described later.

Meanwhile in Step S114, if the reference key information piece and the comparison key information piece are not related to each other (NO in Step S114), a process for the case of mismatch is performed in Step S124, then the routine terminates. The process for the case of mismatch will be further described later.

As described above, everytime one sheet is read, it is judged about the sheet whether or not a reference key information piece and a comparison key information piece are related to each other, and if it is judged about all respective sheets of a document that a reference key information piece and a comparison key information piece are related to each other, a print output process in Step S120 is enabled. On the other hand, if it is judged about at least one sheet of a document that a reference key information piece and a comparison key information piece are not related to each other, a process for the case of mismatch is performed in Step S124.

Hereinafter, subroutines that correspond to the reference key information taking process in Step S108 of FIG. 6 and the comparison key information taking process in Step S110 of FIG. 6, will be explained with reference to FIG. 7.

Figure 7A:
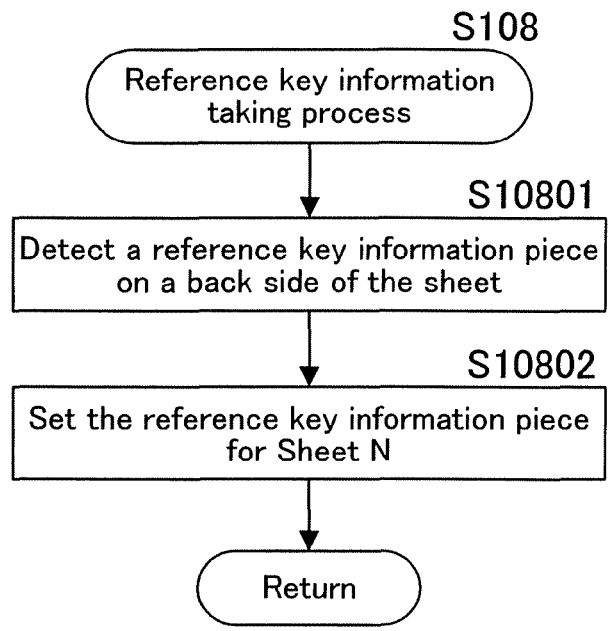
FIG. 7 shows flowcharts representing subroutines that correspond to a reference key information taking process in Step S108 of FIG. 6 and a comparison key information taking process in Step S110 of FIG. 6.

As for the reference key information taking process shown in FIG. 7(A), initially, a reference key information piece on a back side of the sheet is detected in Step S10801. After that, the detected reference key information piece is set as the reference key information piece for Sheet N, in Step S10802.

Figure 7B:
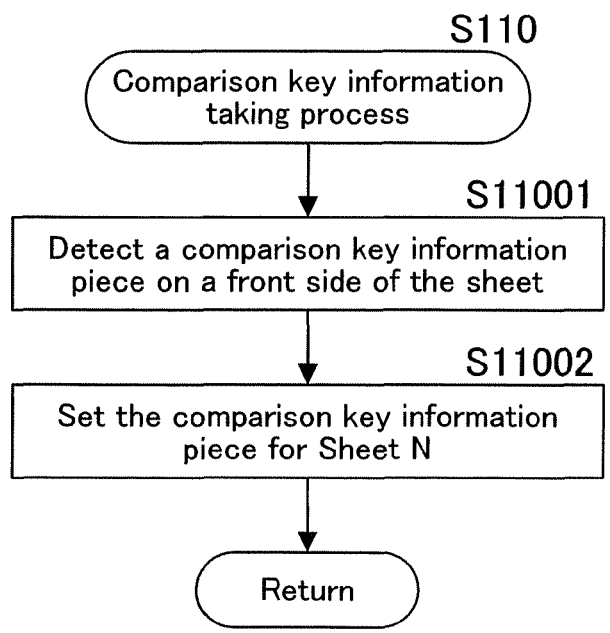

As for the comparison key information taking process shown in FIG. 7(B), initially, a comparison key information piece on a front side of the sheet is detected in Step S11001. After that, the detected comparison key information piece is set as the comparison key information piece for Sheet N, in Step S11002.

Since the method for detecting a ground pattern or other key information employed as a reference key information piece or a comparison key information piece is heretofore known, detailed explanation thereof is omitted.

Hereinafter, a subroutine that corresponds to the comparison process in Step S112 of FIG. 6, will be explained with reference to FIG. 8.

In Step S11201, it is judged whether or not there exists the reference key information piece for Sheet N. If there exists (YES in Step S11201), then it is judged in Step S11202 whether or not there exists the comparison key information piece for Sheet N. If there exists (YES in Step S11202), then it is judged in Step S11203 whether or not the reference key information piece and the comparison key information piece for Sheet N are coincident with each other.

If these are coincident with each other (YES in Step S11203), then it is judged that the reference key information piece and the comparison key information piece are related to each other, in Step S11204. Meanwhile, if there does not exist the reference key information piece for Sheet N in Step S11201 (NO in Step S11201), in other words, if a reference key information piece is not detected from Sheet N; if there does not exist the comparison key information piece for Sheet N in Step S11202 (NO in Step S11202), in other words, if a comparison key information piece is not detected from Sheet N; or if the reference key information piece and the comparison key information piece for Sheet N are not coincident with each other in Step S11203 (NO in Step S11203), then it is judged that those key information pieces are not related to each other, in Step S11205. According to this relativity judgment result, YES or No is determined in Step S114 of FIG. 6.

Figure 9:
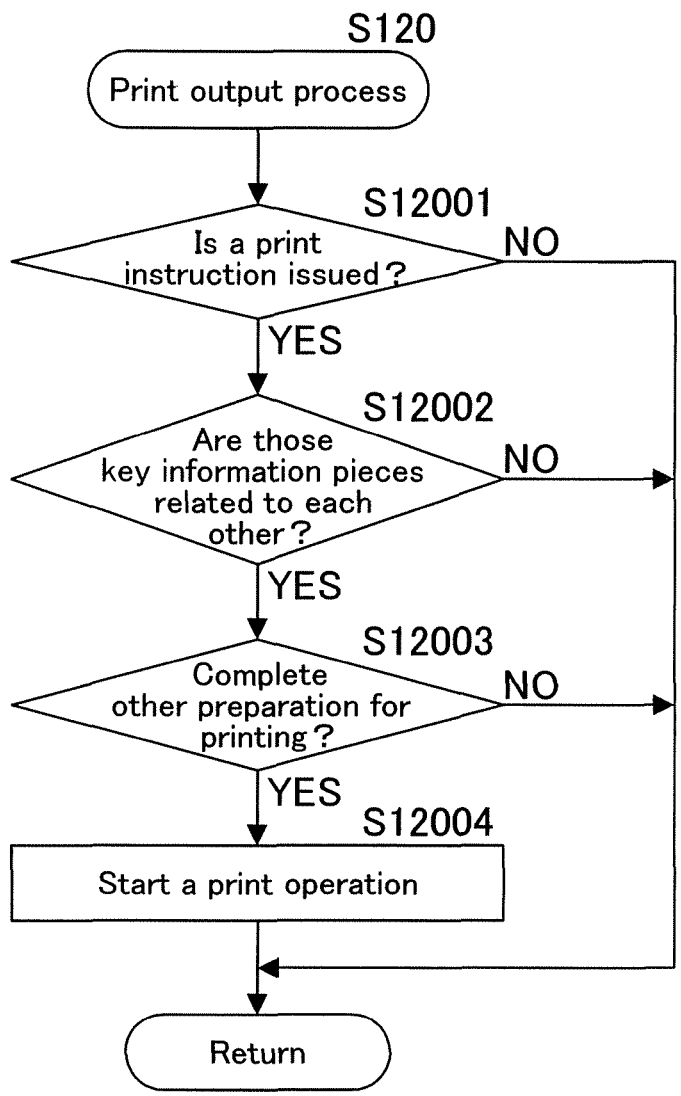
FIG. 9 is a flowchart representing a subroutine that corresponds to a print output process in Step S120 of FIG. 6.

FIG. 9 is a flowchart representing a subroutine that corresponds to the print output process in Step S120 of FIG. 6.

Initially, in Step S12001, it is judged whether or not a print instruction is issued by user. If a print instruction is not issued by user (NO in Step S12001), the routine returns. If a print instruction is issued by user (YES in Step S12001), then it is judged in Step S12002 whether or not those key information pieces are related to each other.

If those key information pieces are not related to each other (NO in Step S12002), the routine returns. If those key information pieces are related to each other (YES in Step S12002), then it is judged in Step S12003 whether or not other preparation for printing is completed. If it is not completed (NO in Step S12003), the routine returns. If it is completed (YES in Step S12003), a print operation is started in Step S12004. As described above, if it is judged about all respective sheets of a document that a reference key information piece and a comparison key information piece are related to each other, a print output operation is permitted, and then if a print instruction is issued by user, a print operation is started.

Figure 10:
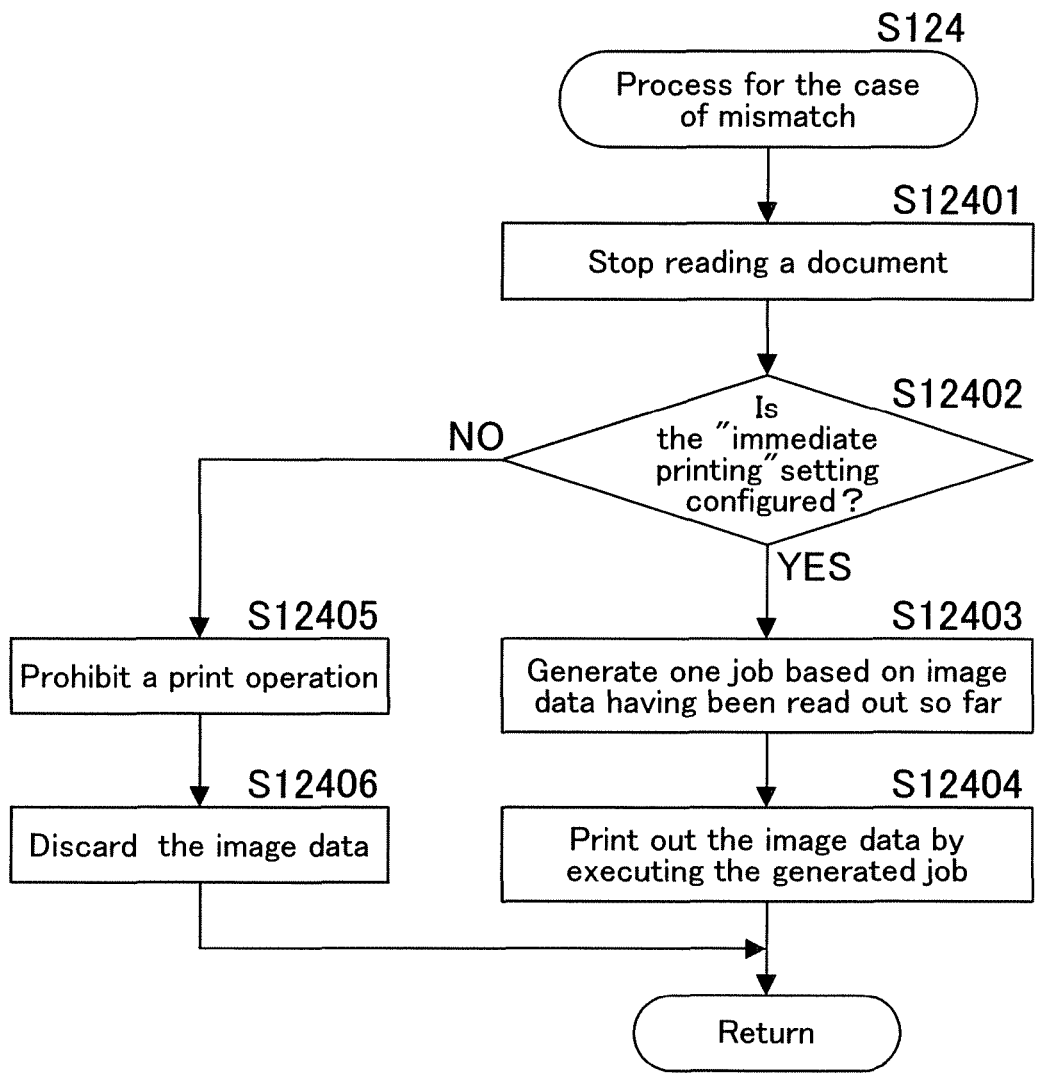
FIG. 10 is a flowchart representing a subroutine that corresponds to a process for the case of mismatch, in Step S124 of FIG. 6.

FIG. 10 is a flowchart representing a subroutine that corresponds to a process for the case of mismatch in Step S124 of FIG. 6.

In Step S12401, a document reading operation is stopped. Then, it is judged in Step S12402 whether or not the setting to print the image data pieces read out from the respective sheets which authenticity is ensured (referred to as the "immediate printing" setting in FIG. 10), is configured. This setting is preliminarily configured by user via the operation panel 17.

If this setting is configured (YES in Step S12402), one job is generated based on the image data having been so far read out from the document, in Step S12403, and the image data is printed out by executing the generated job in Step S12404. And thus, users can easily recognize that a sheet following the sheet that originates an image data piece lastly printed out, is not an original one.

Meanwhile, if the setting is not configured (NO in Step S12402), a print operation is prohibited in Step S12405. After that, the image data having been so far read out from the document are discarded in Step S12406. And thus, image data read out from the document can be prevented from being outputted.

As described above in this embodiment, a reference key information piece and a comparison key information piece are compared to each other, and it is judged whether or not the reference key information piece and the comparison key information piece are related to each other, and if it is judged about all respective judgment target sheets of a document that a reference key information piece and a comparison key information piece are related to each other, then the printer 16 is permitted to print image data pieces read out from all these sheets. Accordingly, the image data pieces read out from all these sheets are outputted, which means that the authenticity of the entire document is ensured. Furthermore, a reference key information piece is embedded on one side of one sheet or more than one respective sheets that is a document and a comparison key information piece is embedded on the other side thereof. Therefore, if one sheet of the document is falsified, the authenticity of the document is not ensured and an output operation is not performed until it is judged about all respective sheets of the document that a reference key information piece and a comparison key information piece are related to each other. Thus, it is extremely difficult to create a perfect false document.

And as described above, if at least either a reference key information piece or a comparison key information piece is not detected, the scanner 14 is stopped from reading a document. And thus, if a false sheet is detected, a reading operation is prevented from being continued uselessly.

And if the "immediate printing" setting is not configured and the document reading operation is stopped, the image data having been so far read out from the document are discarded and a print operation is prohibited. And thus, the risk that image data read out from a false document is printed out and wrongly used, can be prevented.

And if the "immediate printing" setting is configured and the document reading operation is stopped, the image data having been so far read out from the document are printed out. And thus, users can easily recognize that a sheet following the sheet that originates image data piece lastly printed out, is not an original one.

Figure 11A:
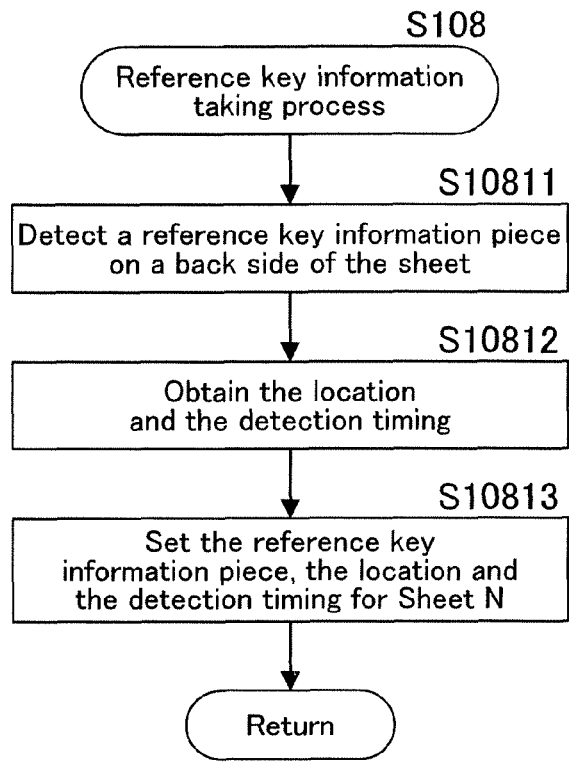
FIG. 11 is another embodiment of the present invention and shows flowcharts representing subroutines that correspond to a reference key information taking process in Step S108 of FIG. 6 and a comparison key information taking process in Step S110 of FIG. 6.
Figure 11B:
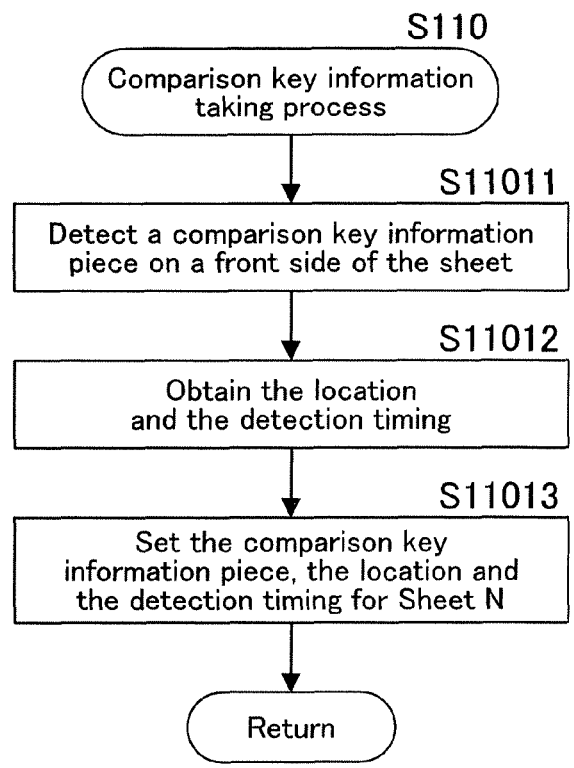
Figure 12:
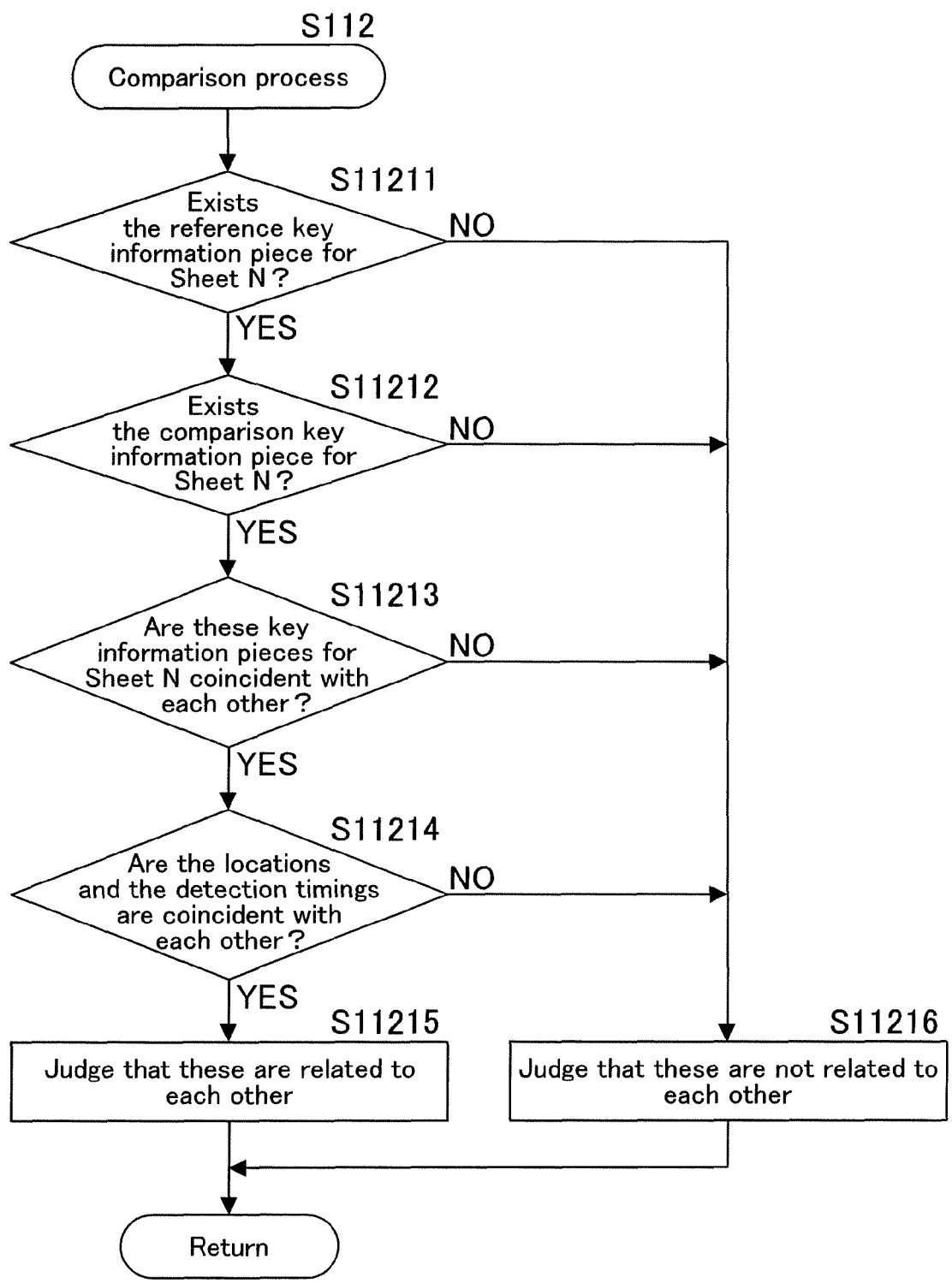
FIG. 12 is a flowchart representing a subroutine that corresponds to a comparison process in Step S112 of FIG. 6, according to the embodiment of FIG. 11.

FIG. 11 and FIG. 12 show another embodiment of the present invention. In this embodiment, a relativity judgment whether or not a reference key information piece and a comparison key information piece are related to each other, is performed based on the locations on a sheet where these key information pieces are embedded and the timings of detecting these key information pieces, as well as the coincidence of these key information pieces.

The main routine for this embodiment corresponds to the flowchart shown in FIG. 6.

As for the reference key information taking process (Step S108 of FIG. 6) shown in FIG. 11(A), a reference key information piece on a back side of the sheet is detected in Step S108011, and the location on the sheet (the location in image data) where the reference key information piece is embedded and the timing of detecting the reference key information piece are obtained, in Step S10812.

Then in Step S10813, the reference key information piece, the location and the detection timing are set as the information for Sheet N.

As for the comparison key information taking process (Step S110 of FIG. 6) shown in FIG. 11(B), initially, a comparison key information piece on a front side of the sheet is detected in Step S11011. After that, the location on the sheet (the location in image data) where the comparison key information piece is embedded and the timing of detecting the comparison key information piece are obtained, in Step S11012.

Then in Step S11013, the comparison key information piece, the location and the detection timing are set as the information for Sheet N.

In this embodiment, the comparison process (Step S112 of FIG. 6) is performed according to a flowchart shown in FIG. 12.

In Step S11211, it is judged whether or not there exists the reference key information piece for Sheet N. If there exists (YES in Step S11211), then it is judged in Step S11212 whether or not there exists the comparison key information piece for Sheet N. If there exists (YES in Step S11212), then it is judged in Step S11213 whether or not the reference key information piece and the comparison key information piece for Sheet N are coincident with each other (these information pieces are the same).

If these are coincident with each other (YES in Step S11213), then it is judged in Step S11214 whether or not the locations on the sheet where those key information pieces are embedded and the timings of detecting those key information pieces are coincident with each other, respectively. If the locations and the timings are coincident with each other, respectively (YES in Step S11214), it is judged that the reference key information piece and the comparison key information piece are related to each other, in Step S11215. Meanwhile, if there does not exist the reference key information piece for Sheet N in Step S11211 (NO in Step S11211); if there does not exist the comparison key information piece for Sheet N in Step S11212 (NO in Step S11212); if the reference key information piece and the comparison key information piece for Sheet N are not coincident with each other in Step S11213 (NO in Step S11213); or if at least either the locations on the sheet where those key information pieces are embedded or the timings of detecting those key information pieces are not coincident with each other, respectively, in Step S11214 (NO in Step S11214), then it is judged that the reference key information piece and the comparison key information piece are not related to each other, in Step S11216. According to this relativity judgment result, YES or No is determined in Step S114 of FIG. 6.

As described above, a relativity judgment is performed also based on the locations on a sheet where a reference key information piece and a comparison key information piece are embedded and the timings of detecting these key information pieces. Therefore, if at least either the locations on a sheet where a reference key information piece and a comparison key information piece are embedded or the timings of detecting these key information pieces are not the same, then it is judged that the reference key information piece and the comparison key information piece are not related to each other. And thus, the accuracy of comparison is improved.

Figure 13:
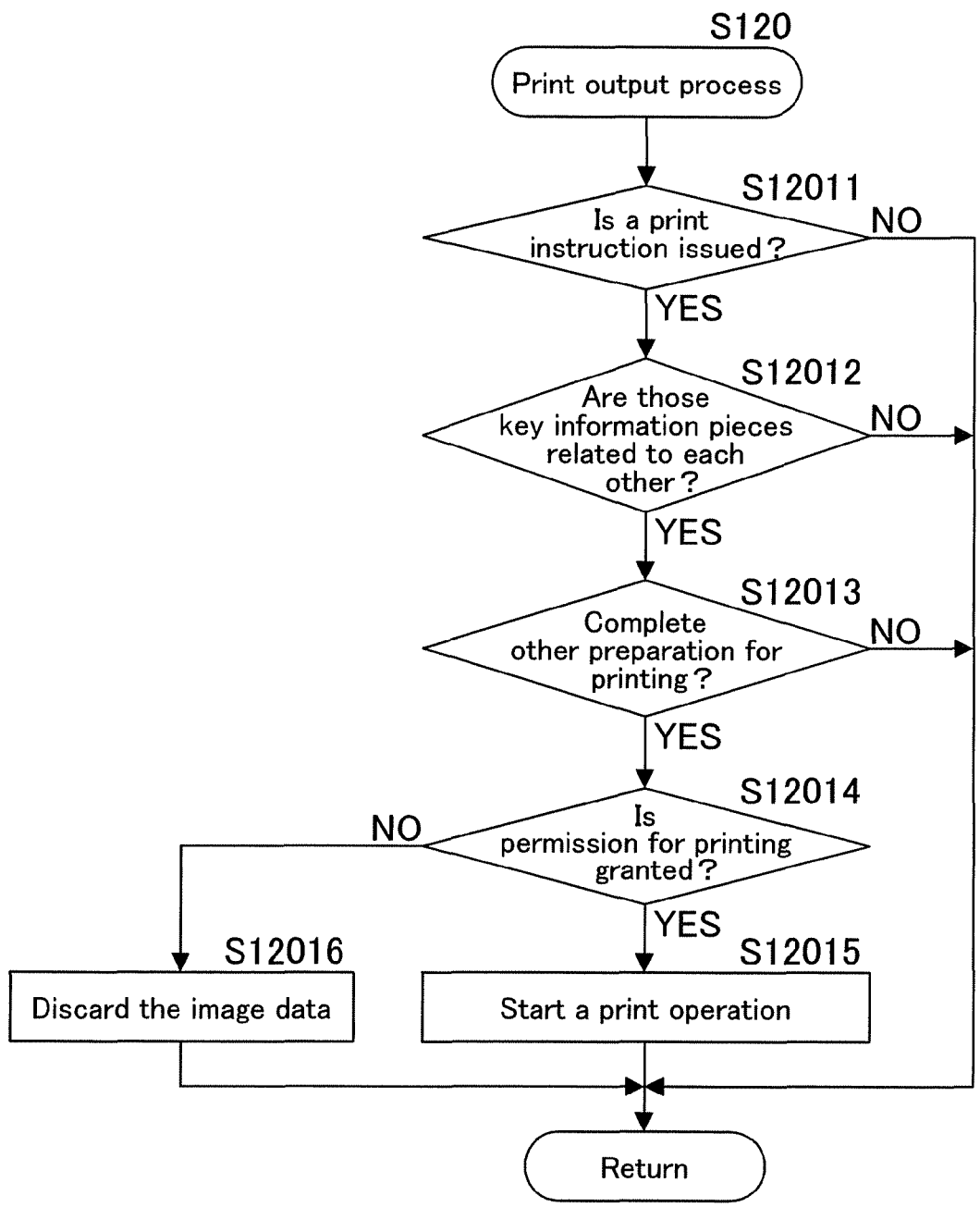
FIG. 13 is yet another embodiment of the present invention and shows a flowchart representing a subroutine that corresponds to a print output process in Step S120 of FIG. 6.

FIG. 13 shows yet another embodiment of the present invention. In this embodiment, the printer 16 is prohibited from printing image data read out from a document as long as no permission is granted to print the image data by the printer 16, even if it is judged that a reference key information piece and a comparison key information piece are related to each other.

The main routine for this embodiment corresponds to the flowchart shown in FIG. 6.

As for the print output process (Step S120 of FIG. 6) shown in FIG. 13, it is judged in Step S12011 whether or not a print instruction is issued by user. If a print instruction is not issued by user (NO in Step S12011), the routine returns. If a print instruction is issued by user (YES in Step S12011), then it is judged in Step S12012 whether or not those key information pieces are related to each other.

If those key information pieces are not related to each other (NO in Step S12012), the routine returns. If those key information pieces are related to each other (YES in Step S12012), then it is judged in Step S12013 whether or not other preparation for printing is completed. If it is not completed (NO in Step S12013), the routine returns. If it is completed (YES in Step S12013), then it is judged in Step S12014 whether or not permission for printing is granted.

This judgment whether or not permission for printing is granted may be performed based on the type of authorization or the number of allowed sheets that is granted to a user trying to perform an output operation, and may be performed according to whether or not a permission instruction is issued by this user, an administrator user or etc. before a document is read. Or alternatively, it may be configured such that output permission information is preliminarily embedded on at least one sheet of the document as a ground pattern for example, and if the ground pattern is detected from image data read out from the document, it is judged that permission for printing is granted.

If permission for printing is granted (YES in Step S12014), a print operation is started in Step S12015.

If permission for printing is not granted (NO in Step S12014), the image data is discarded and a print operation is prohibited, in Step S12016.

Figure 14:
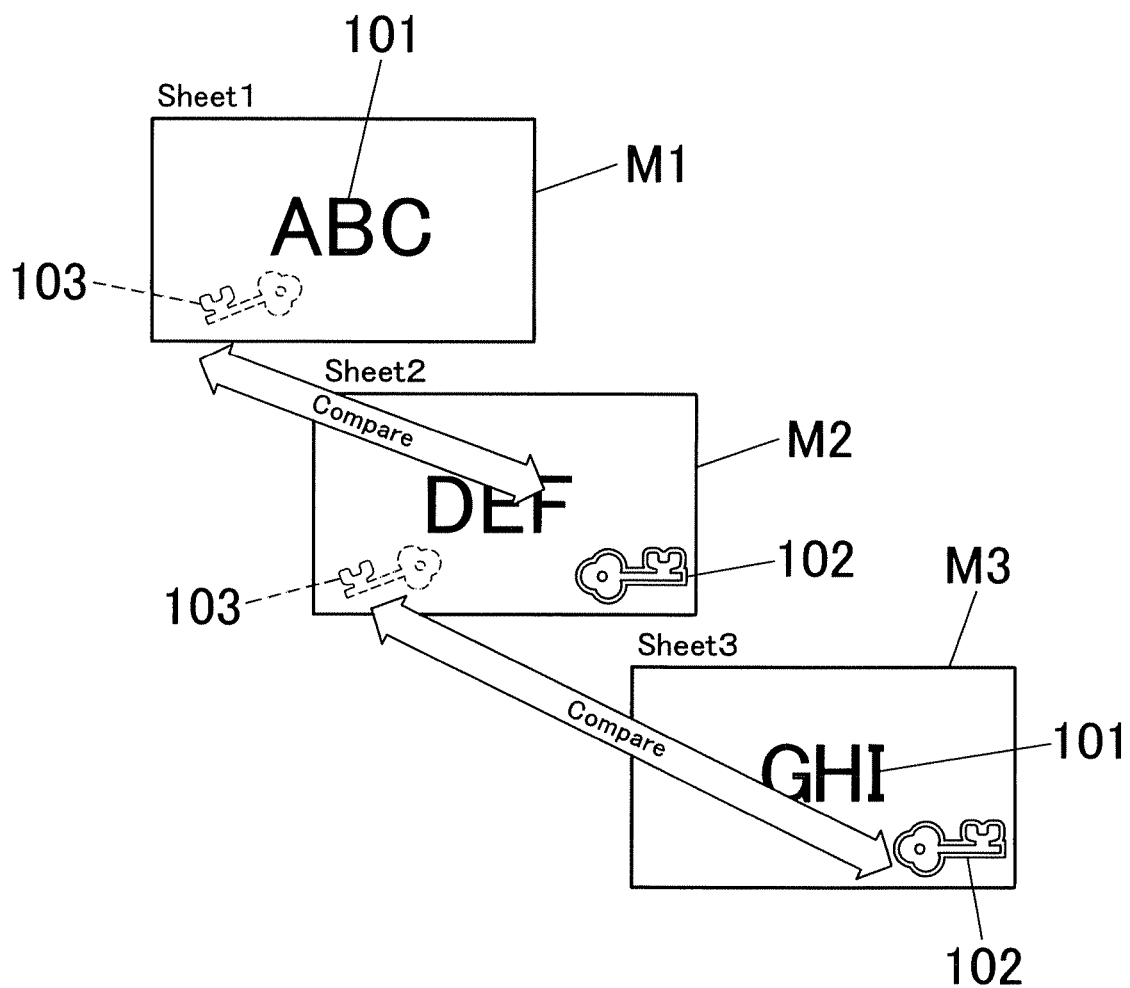
FIG. 14 is still yet another embodiment of the present invention and shows a view to explain how to check the authenticity of a document, if a reference key information piece is embedded on one side of a sheet of the document and a comparison key information piece is embedded on the other side of a following sheet of the document.
Figure 15A:
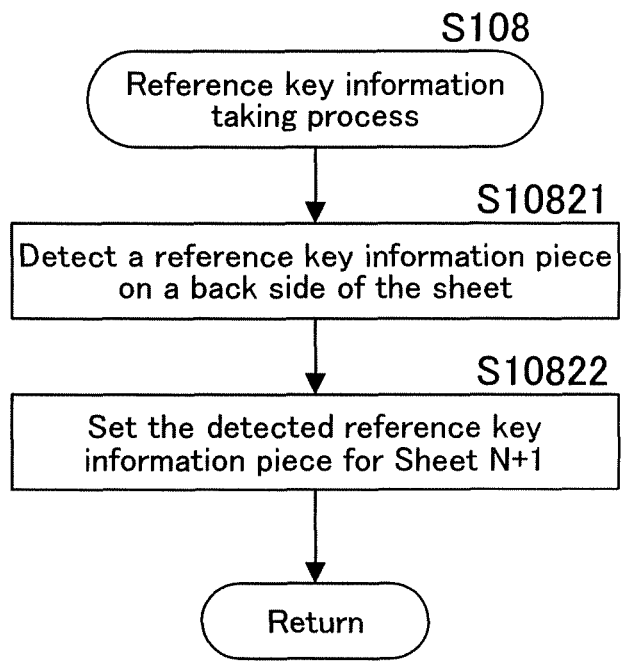
FIG. 15 shows flowcharts representing subroutines that correspond to a reference key information taking process in Step S108 of FIG. 6 and a comparison key information taking process in Step S110 of FIG. 6, according to the embodiment of FIG. 14.
Figure 15B:
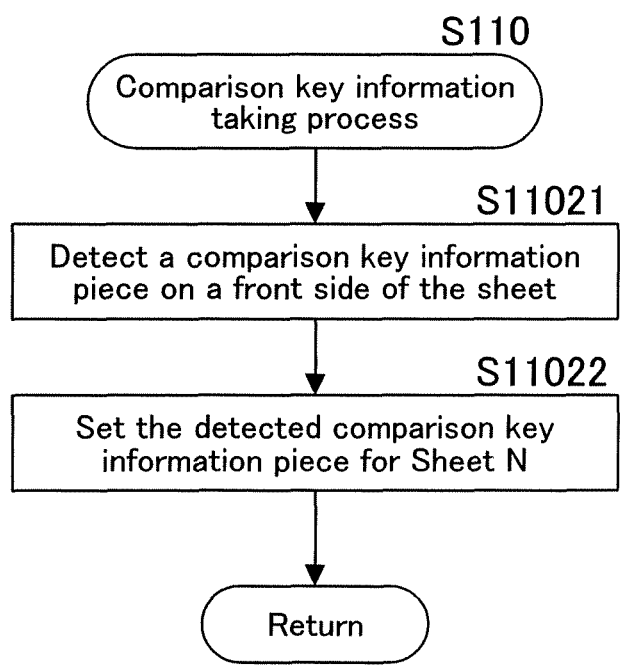
Figure 16:
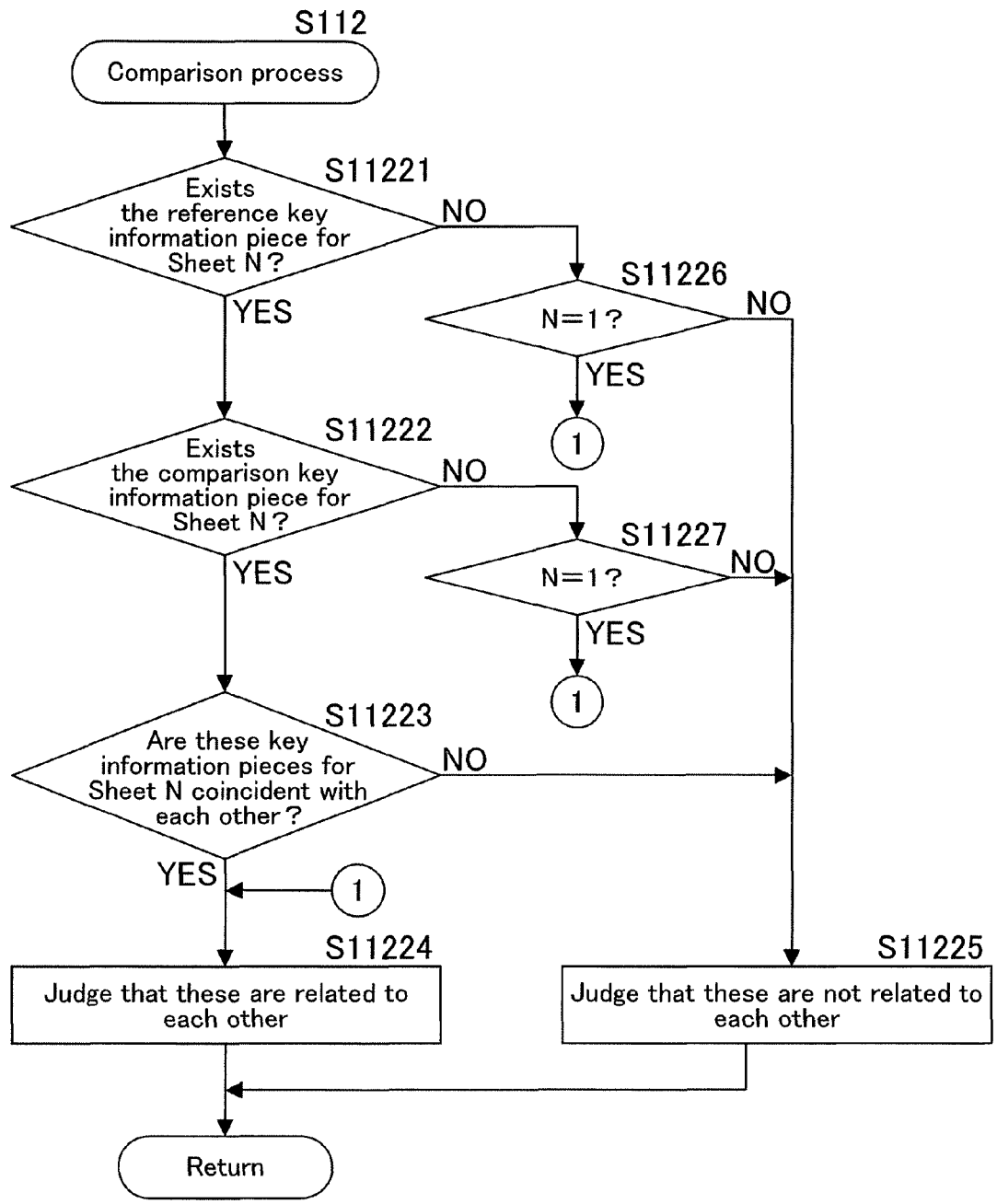
FIG. 16 is a flowchart representing a subroutine corresponding to a comparison process in Step S112 of FIG. 6, according to the embodiment of FIG. 14.

FIG. 14 through FIG. 16 show still yet another embodiment of the present invention.

In this embodiment, a reference key information piece is embedded on one side of a sheet of a document and a comparison key information piece is embedded on the other side of a following sheet of the document.

As shown in FIG. 14, an image 101 is printed on a front side of a first sheet M1 and a reference key information piece 103 is embedded on a back side thereof. Meanwhile, the image 101 is printed and a comparison key information piece 102 is embedded on a front side of a second sheet M2, furthermore the reference key information piece 103 is embedded on a back side thereof. Similarly, the image 101 is printed and the comparison key information piece 102 is embedded on a front side of a third sheet M3, furthermore the reference key information piece 103 is embedded on a back side thereof.

The reference key information piece 103 on a back side of the first sheet M1 and the comparison key information piece 102 on a front side of the second sheet M2 are a pair to be compared to each other. Similarly, the reference key information piece 103 on a back side of the second sheet M2 and the comparison key information piece 102 on a front side of the third sheet M3 are a pair to be compared to each other. These pairs, the reference key information pieces 103 and the comparison key information pieces 102, are compared to each other, and thereby it is judged whether or not these key information pieces are related to each other. In this way, the authenticity of the respective sheets is checked.

The main routine for this embodiment corresponds to the flowchart shown in FIG. 6.

As for the reference key information taking process (Step S108 of FIG. 6) shown in FIG. 15(A), a reference key information piece on a back side of the sheet is detected in Step S10821. And the detected reference key information piece is set as the reference key information piece for Sheet N+1, in Step S10822, so that it could be compared to the reference key information piece for a following sheet of the document.

As for the comparison key information taking process (Step S110 of FIG. 6) shown in FIG. 15(B), a comparison key information piece on a front side of the sheet is detected in Step S11021. After that, the detected comparison key information piece is set as the comparison key information piece for Sheet N, in Step S11021.

In this embodiment, the comparison process (Step S112 of FIG. 6) is performed according to a flowchart shown in FIG. 16.

In Step S11221, it is judged whether or not there exists the reference key information piece for Sheet N. If there exists (YES in Step S11221), then it is judged in Step S11222 whether or not there exists the comparison key information piece for Sheet N. If there exists (YES in Step S11222), then it is judged in Step S11223 whether or not the reference key information piece and the comparison key information piece for Sheet N, in other words, a reference key information piece on a present sheet of the document and a comparison key information piece on a following sheet of the document, are coincident with each other.

If these are coincident with each other (YES in Step S11223), then it is judged that the reference key information piece and the comparison key information piece are related to each other, in Step S11224. Thus, the sequentiality between the present sheet and the following sheet is ensured.

Meanwhile, if there does not exist the reference key information piece for Sheet N in Step S11221 (NO in Step S11221), then it is judged in Step S11226 whether or not it is N=1. If it is not N=1 (NO in Step S11226), then it is judged that those are not related to each other, in Step S11225. If it is N=1 (YES in Step S11226), the routine proceeds to Step S11224 and it is judged that those are related to each other.

Meanwhile, if there does not exist the comparison key information piece for Sheet N in Step S11222 (NO in Step S11222), then it is judged in Step S11227 whether or not it is N=1. If it is not N=1 (NO in Step S11227), then it is judged that those are not related to each other, in Step S11225. If it is N=1 (YES in Step S11227), the routine proceeds to Step S11224 and it is judged that those are related to each other. If those two key information pieces are not coincident with each other in Step S11223, the routine proceeds also to Step S11224 and it is judged that those are related to each other.

As described above, it is judged whether or not it is N=1, if there does not exist the reference key information piece or the comparison key information piece for Sheet N. This is intended to prevent a relativity judgment about the first sheet M1 from turning to "NO", because there do not exist the reference key information piece neither the comparison key information piece to check the authenticity of the first sheet M1.

As described above in this embodiment, the authenticity of a document is checked by using consecutive sheets of the document.

Figure 17:
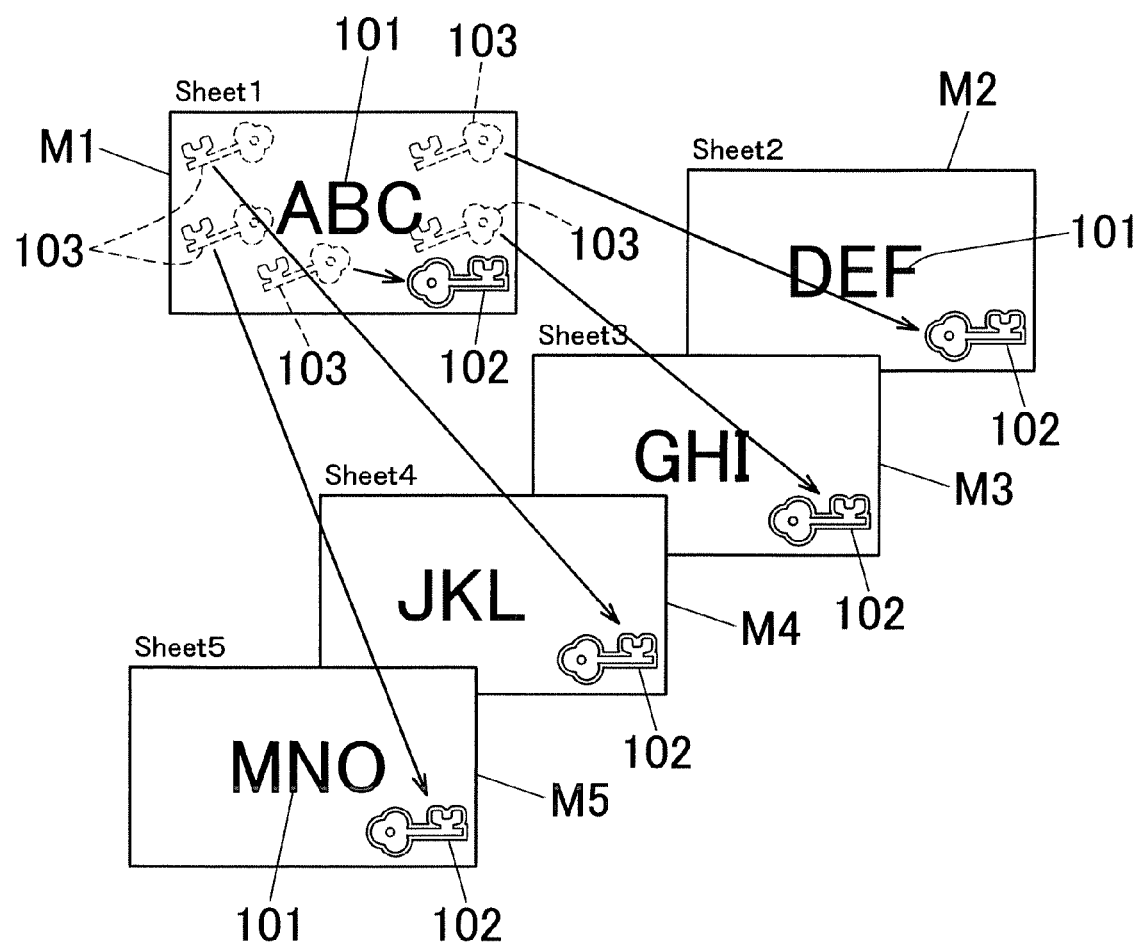
FIG. 17 is further still yet another embodiment of the present invention and shows a view to explain how to check the authenticity of a document, if reference key information pieces to be compared to comparison key information pieces from one pair to another, are collectively embedded on a cover sheet of the document.
Figure 18:
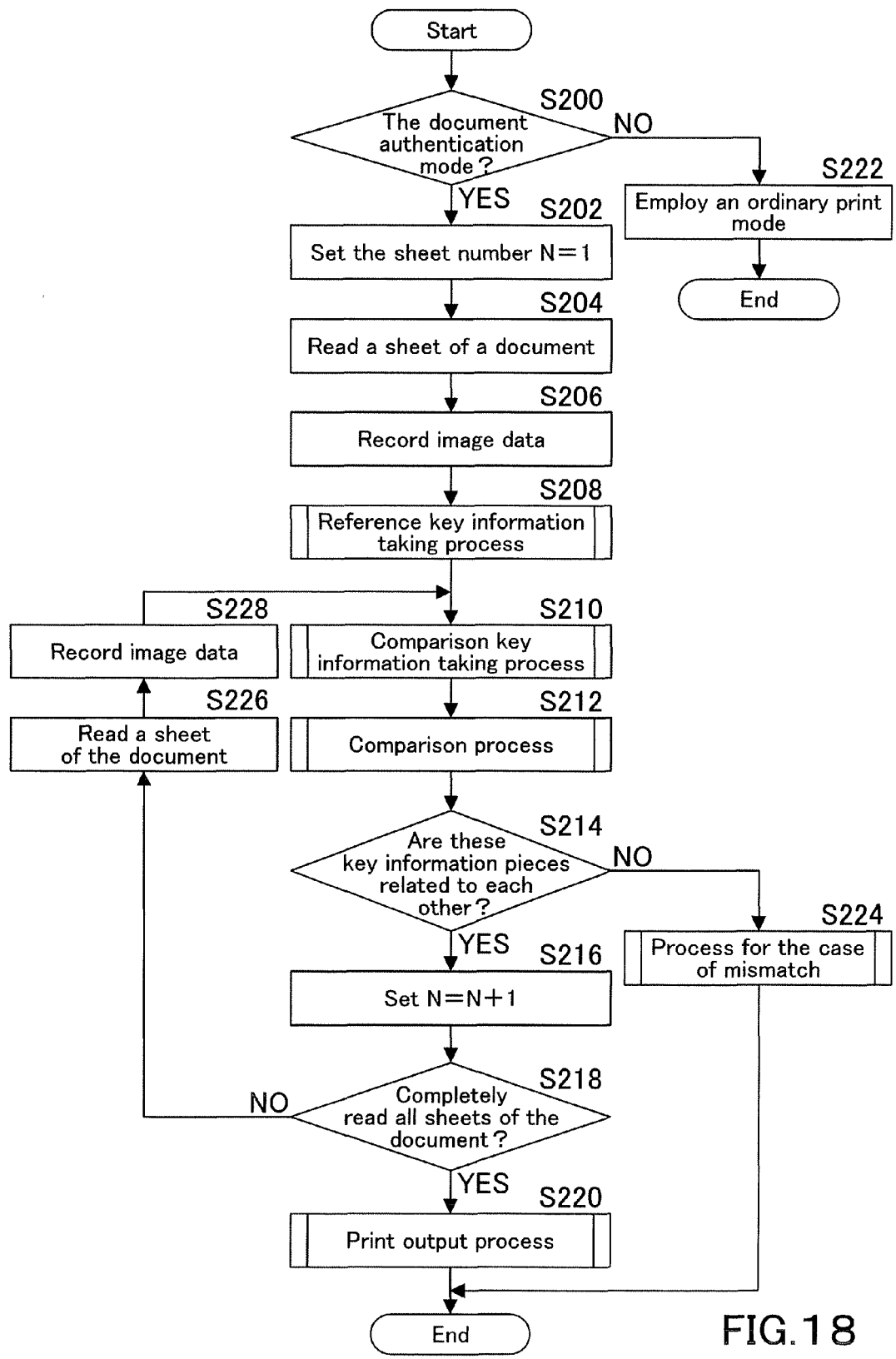
FIG. 18 is a flowchart representing a procedure executed in the image processing apparatus to check the authenticity of a document, according to the embodiment of FIG. 17.

FIG. 17 through FIG. 19 show further still yet another embodiment of the present invention. In this embodiment, reference key information pieces to be compared to comparison key information pieces from one pair to another, are collectively embedded on a cover sheet of a document.

As shown in FIG. 17, an image 101 is printed and a comparison key information piece 102 is embedded on a front side of a first sheet M1 (a cover sheet of a document). Meanwhile, a plurality of reference key information pieces (five pieces, in this example) are embedded on a back side thereof. These reference information pieces 103 are to be compared to comparison key information pieces 102 from one pair to another, which are singly embedded on front sides of a plurality of respective sheets (five sheets, in this example) of the document.

The plurality of reference key information pieces detected from the first sheet and the comparison key information pieces detected from the respective sheets are compared to each other from one pair to another, and thereby it is judged whether or not these key information pieces are related to each other.

FIG. 18 is a flowchart representing a procedure executed in the image processing apparatus 1, to check the authenticity of a document, if reference key information pieces to be compared to comparison key information pieces from one pair to another, are collectively embedded on a cover sheet of the document, as explained with FIG. 17.

This procedure is executed by the CPU 11 according to a program recorded in a recording medium such as the ROM 12.

Initially, in Step S200, it is judged whether or not the document authentication mode is set on the image processing apparatus 1.

If the document authentication mode is not set thereon (NO in Step S200), an ordinary print mode is employed in Step S222.

If the document authentication mode is set thereon (YES in Step S200), a parameter N indicating the sheet number is set to "1" in Step S202. Then, both sides of a sheet of a document are read at the same time by the scanner 14 in Step S204, and image data read out from the sheet is recorded in the memory 15 or etc. in Step S206.

Subsequently, a reference key information taking process is performed in Step S208, and a comparison key information taking process is performed in Step S210, and a comparison process is performed in Step S212. The reference key information taking process, the comparison key information taking process and the comparison process will be further described later.

Then in Step S214, according to the comparison result, it is judged whether or not a reference key information piece and a comparison key information piece are related to each other. If these key information pieces are related to each other (YES in Step S214), "1" is added to the parameter N in Step S216. Then, it is judged in Step S218 whether or not all sheets of the document are completely read.

If all the sheets are not completely read (NO in Step S218), a following sheet of the document is read in Step S226, and obtained image data is recorded in Step S228. Since the reference key information pieces are already detected from the cover sheet, the routine goes back to the comparison key information taking process in Step S210 and repeats Steps S210 through S218 until all the sheets are completely read. If all the sheets are completely read (YES in Step S218), a print output process is performed in Step S220, then the routine terminates.

Meanwhile in Step S214, if a reference key information piece and a comparison key information piece are not related to each other (NO in Step S214), a process for the case of mismatch is performed in Step S224, then the routine terminates.

FIG. 19 shows flowcharts representing subroutines that correspond to the reference key information taking process in Step S208 of FIG. 18 and the comparison key information taking process in Step S210 of FIG. 18.

Figure 19A:
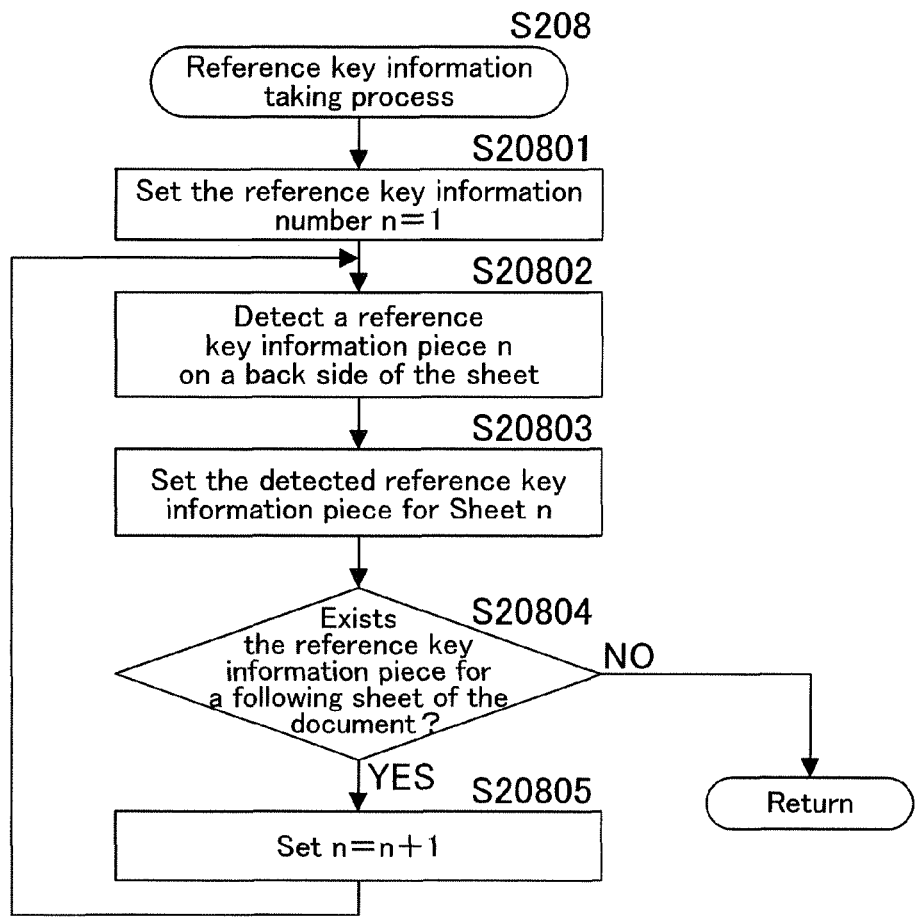
FIG. 19 shows flowcharts representing subroutines that correspond to a reference key information taking process in Step S208 of FIG. 18 and a comparison key information taking process in Step S210 of FIG. 18.

As for the reference key information taking process shown in FIG. 19(A), a parameter n indicating the reference key information number is set to "1". And a first reference key information piece on a back side of the sheet is detected in Step S20802. After that, the detected first reference key information piece is set as the reference key information piece for Sheet 1, in Step S20803.

Subsequently, it is judged in Step S20804 whether or not there exists the reference key information piece for a following sheet of the document. If there exists (YES in Step S20804), "1" is added to the parameter n in Step S20805. Then the routine goes back to Step S20802 and repeats Steps S20802 through S20805 until there does not exist the reference key information piece for a following sheet of the document.

If there does not exist the reference key information piece for the following sheet (NO in Step S20804), the routine returns. In this way, the detected reference key information pieces are preliminarily set as the reference key information pieces for Sheet 1 through Sheet 5, respectively.

Figure 19B:
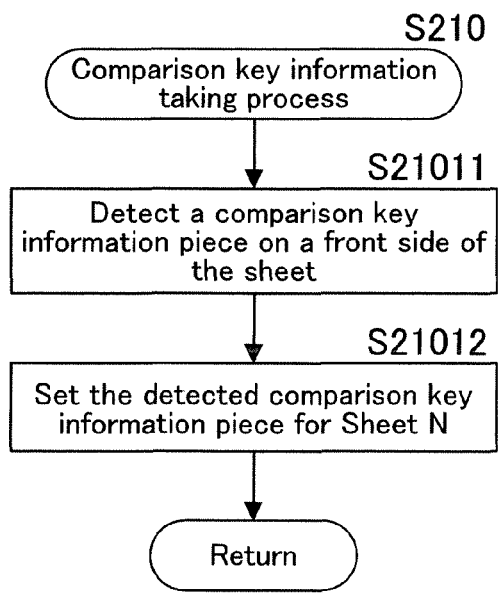

As for the comparison key information taking process shown in FIG. 19(B), initially, a comparison key information piece on a front side of the sheet is detected in Step S21011. After that, the detected comparison key information piece is set as the comparison key information piece for Sheet N, in Step S21012.

Figure 8:
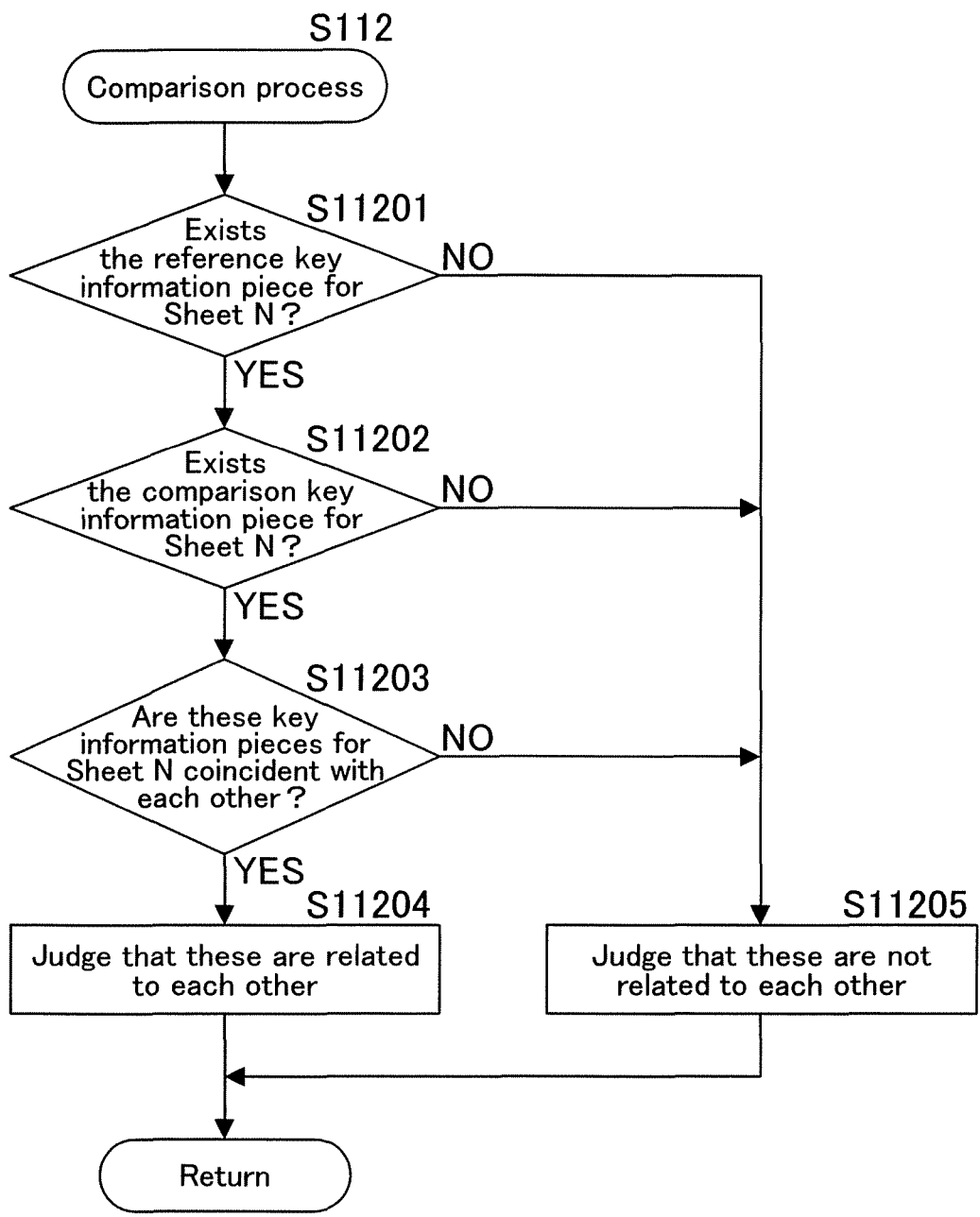
FIG. 8 is a flowchart representing a subroutine that corresponds to a comparison process in Step S112 of FIG. 6.

The comparison process in Step S212 of FIG. 18, the print output process in Step S220 of FIG. 18 and the process for the case of mismatch in Step S224 of FIG. 18 are exactly the same as the comparison process (Step S112), the print output process (Step S120) and the process for the case of mismatch (Step S124) explained with FIG. 8 through FIG. 10, respectively. Therefore, explanation thereof is omitted.

As for the comparison process in Step S212 in this embodiment, everytime one sheet is read, it is judged whether or not the reference key information piece 103 detected from the cover sheet M1 and the comparison key information piece 102 detected from the read sheet are related to each other, as shown in FIG. 8. And only if it is judged about all the sheets that these key information pieces are related to each other, the print output process in Step S220 is enabled.

As described above in this embodiment, reference key information pieces to be compared to comparison key information pieces on respective sheets of a document from one pair to another, are collectively embedded on a cover sheet of the document. Therefore, the authenticity of the respective sheets can be checked by using the cover sheet, and there is no need to bother embedding reference key information pieces on the respective sheets. And thus, original documents can be created in an easier manner.

In the example explained with FIG. 17 through FIG. 19, the comparison key information piece 102 is embedded on the cover sheet M1, just like in the case of the second sheet M2 and the following sheets. However, the comparison key information piece 102 is not necessarily embedded on the cover sheet.

Figure 20:
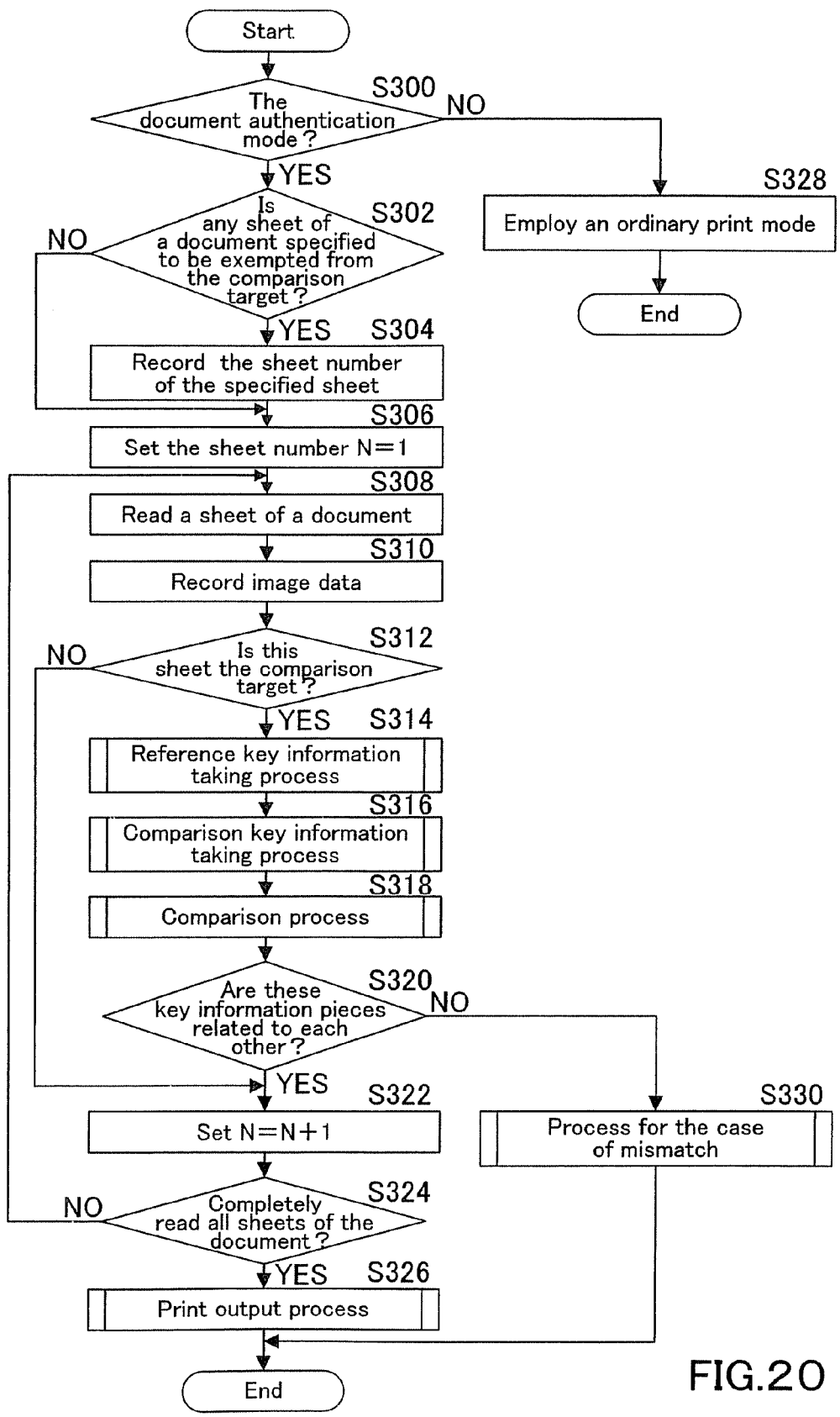
FIG. 20 is further still yet another embodiment of the present invention, and this embodiment shows a flowchart representing a procedure executed to check the authenticity of a document, if a reference key information piece is embedded on one side of a sheet of the document and a comparison key information piece is embedded on the other side of a following sheet of the document, as explained with FIG. 14, and a sheet of the document is specified by user, to be exempted from the comparison target.

FIG. 20 shows further still yet another embodiment of the present invention. In this embodiment, a reference key information piece is embedded on one side of a sheet of a document and a comparison key information piece is embedded on the other side of a following sheet of the document, as explained with FIG. 14. And this is a flowchart representing a procedure executed to check the authenticity of the document, if a sheet of the document is specified by user, to be exempted from the comparison target.

In Step S300, it is judged whether or not the document authentication mode is set on the image processing apparatus 1. If the document authentication mode is not set thereon (NO in Step S300), an ordinary print mode is employed in Step S222.

If the document authentication mode is set thereon (YES in Step S300), then it is judged in Step S302 whether or not any sheet of a document is specified by user, to be exempted from the comparison target. If no sheet is specified (NO in Step S302), the routine proceeds to Step S306. If one sheet is specified (YES in Step S302), the sheet number of the sheet specified to be exempted from the comparison target is recorded in Step S304, then the routine proceeds to Step S306.

In Step S306, a parameter N indicating the sheet number is set to "1". After that, both sides of a sheet of the document is read at the same time by the scanner 14 in Step S308, and image data read out from the sheet is recorded in the memory 15 or etc. in Step S310.

Subsequently, it is judged in Step S312 whether or not the read sheet is the comparison target. If it is the comparison target (YES in Step S312), a reference key information taking process is performed in Step S314, a comparison key information taking process is performed in Step S316, and a comparison process is performed in Step S318. Then in Step S320, according to the comparison result, it is judged whether or not a reference key information piece and a comparison key information piece are related to each other. If these are related to each other (YES in Step S320), the routine proceeds to Step S322. If these are not related to each other (NO in Step S320), a process for the case of mismatch is performed in Step S330. Then the routine terminates.

Meanwhile in Step S312, if the read sheet is not the comparison target (NO in Step S312), the routine proceeds directly to Step S322. Thus, the reference key information taking process, the comparison key information taking process and the comparison process are not performed about the sheet exempted from the comparison target.

In Step S322, "1" is added to the parameter N. Then, it is judged in Step S324 whether or not all sheets of the document are completely read.

If all the sheets are not completely read (NO in Step S324), the routine goes back to Step S308 and repeats Steps S308 through S324 about a following sheet of the document. If all the sheets are completely read (YES in Step S324), a print output process is performed in Step S326, then the routine terminates.

Hereinafter, subroutines corresponding to the reference key information taking process in Step S314 of FIG. 20 and the comparison key information taking process in Step S316 of FIG. 20, will be explained with reference to FIG. 21.

Figure 21A:
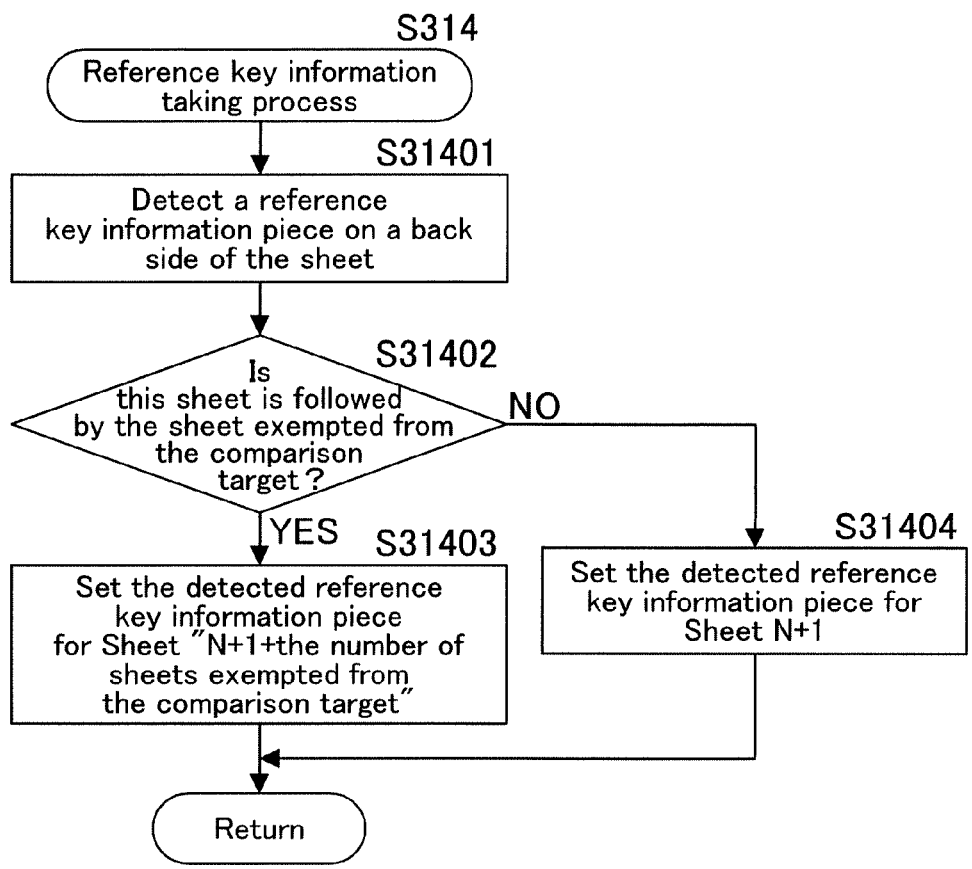
FIG. 21 shows flowcharts representing subroutines that correspond to a reference key information taking process in Step S314 of FIG. 20 and a comparison key information taking process in Step S316 of FIG. 20.

As for the reference key information taking process shown in FIG. 21(A), initially, a reference key information piece on a back side of the sheet is detected in Step S31401. Then, it is judged in Step S31402 whether or not the sheet having the detected reference key information piece is followed by the sheet exempted from the comparison target.

If the sheet having the detected reference key information piece is followed by the sheet exempted from the comparison target (YES in Step S31402), the detected reference key information piece is set as the reference key information piece for Sheet "N+1+the number of sheets exempted from the comparison target", in Step S31403. In other words, the reference key information piece detected from the sheet followed by the sheet exempted from the comparison target, is set as the reference key information piece for a comparison target sheet of the document, coming next to the sheet exempted from the comparison target.

On the other hand, if the sheet having the detected reference key information piece is not followed by the sheet exempted from the comparison target (NO in Step S31402), the detected reference key information piece is set as the reference key information piece for Sheet "N+1", in Step S31404. Then the routine returns.

Figure 21B:
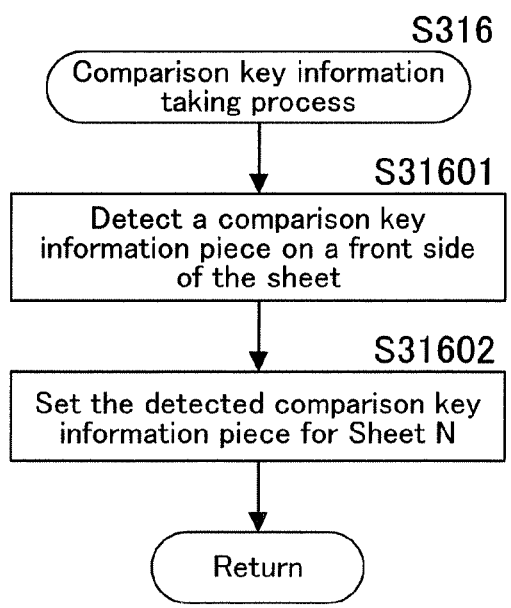

As for the comparison key information taking process shown in FIG. 21(B), initially, a comparison key information piece on a front side of the sheet is detected in Step S31601. After that, the detected comparison key information piece is set as the comparison key information piece for Sheet N, in Step S31602.

The comparison process in Step S318 of FIG. 20, the print output process in Step S326 of FIG. 20 and the process for the case of mismatch in Step S330 of FIG. 20 are exactly the same as the comparison process (Step S112), the print output process (Step S120) and the process for the case of mismatch (Step S124) explained with FIG. 8 through FIG. 10, respectively. Therefore, explanation thereof is omitted.

As described above in this embodiment, a comparison process and etc. are not performed about a sheet of a document, exempted from the comparison target, and a reference key information piece detected from a sheet of the document, followed by the sheet exempted from the comparison target, is set as the reference key information piece for a comparison target sheet of the document, coming next to the sheet exempted from the comparison target. And even if a sheet of a document is specified to be exempted from the comparison target, a relativity judgment is properly performed without unfavorable effects. Thus, even if an owner of the document replaces a sheet of the document with a new sheet not having a reference key information piece and a comparison key information piece embedded thereon, he/she can have the entire document outputted according to "YES" drawn as the relativity judgment result.

Figure 22:
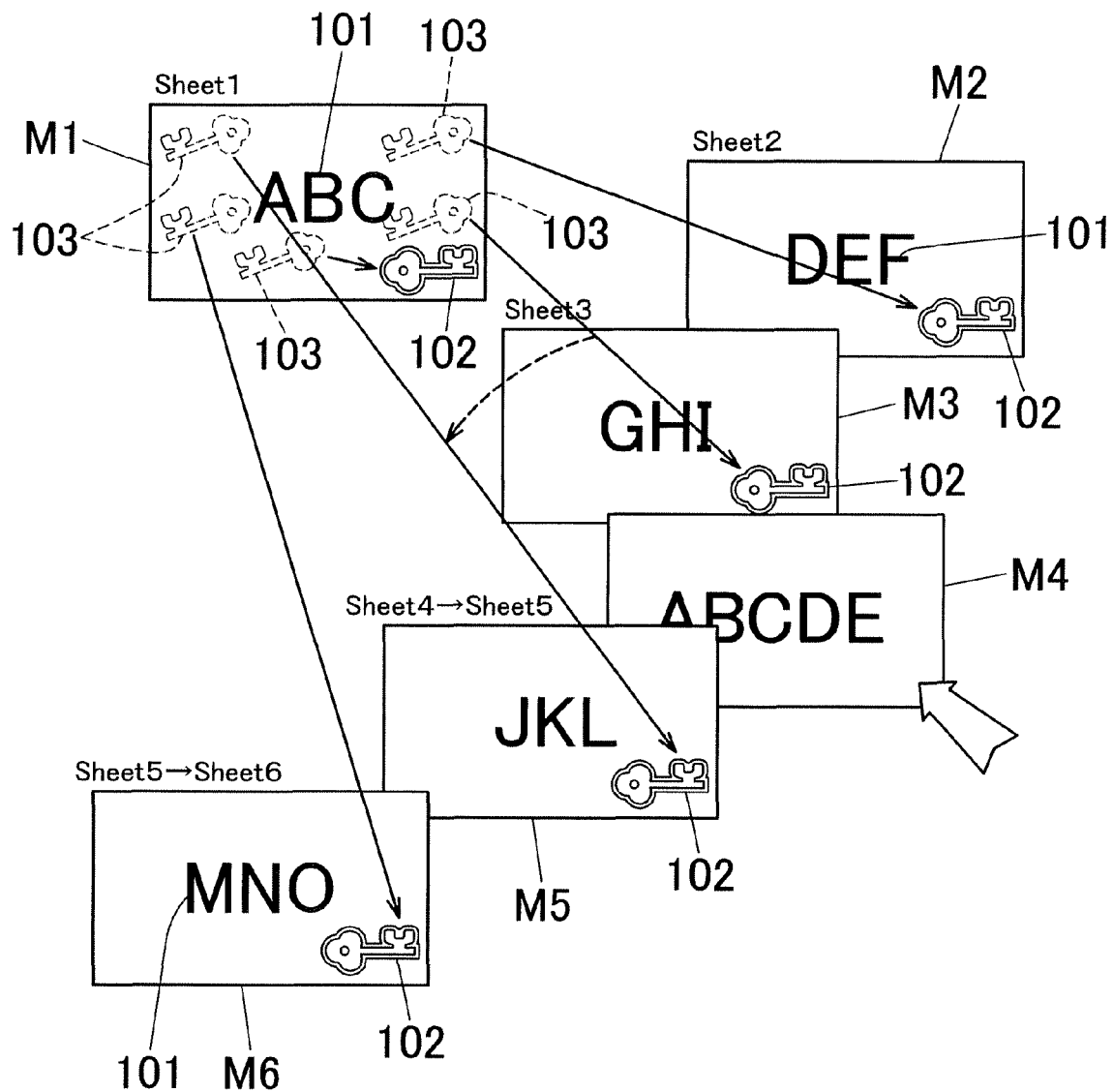
FIG. 22 is further still yet another embodiment of the present invention, and this embodiment shows a view to explain how to check the authenticity of a document, if reference key information pieces to be compared to comparison key information pieces from one pair to another, are collectively embedded on a cover sheet of the document, as explained with FIG. 17, and an inserted sheet M4 is inserted between Sheet 3 and Sheet 4 of the document.
Figure 23:
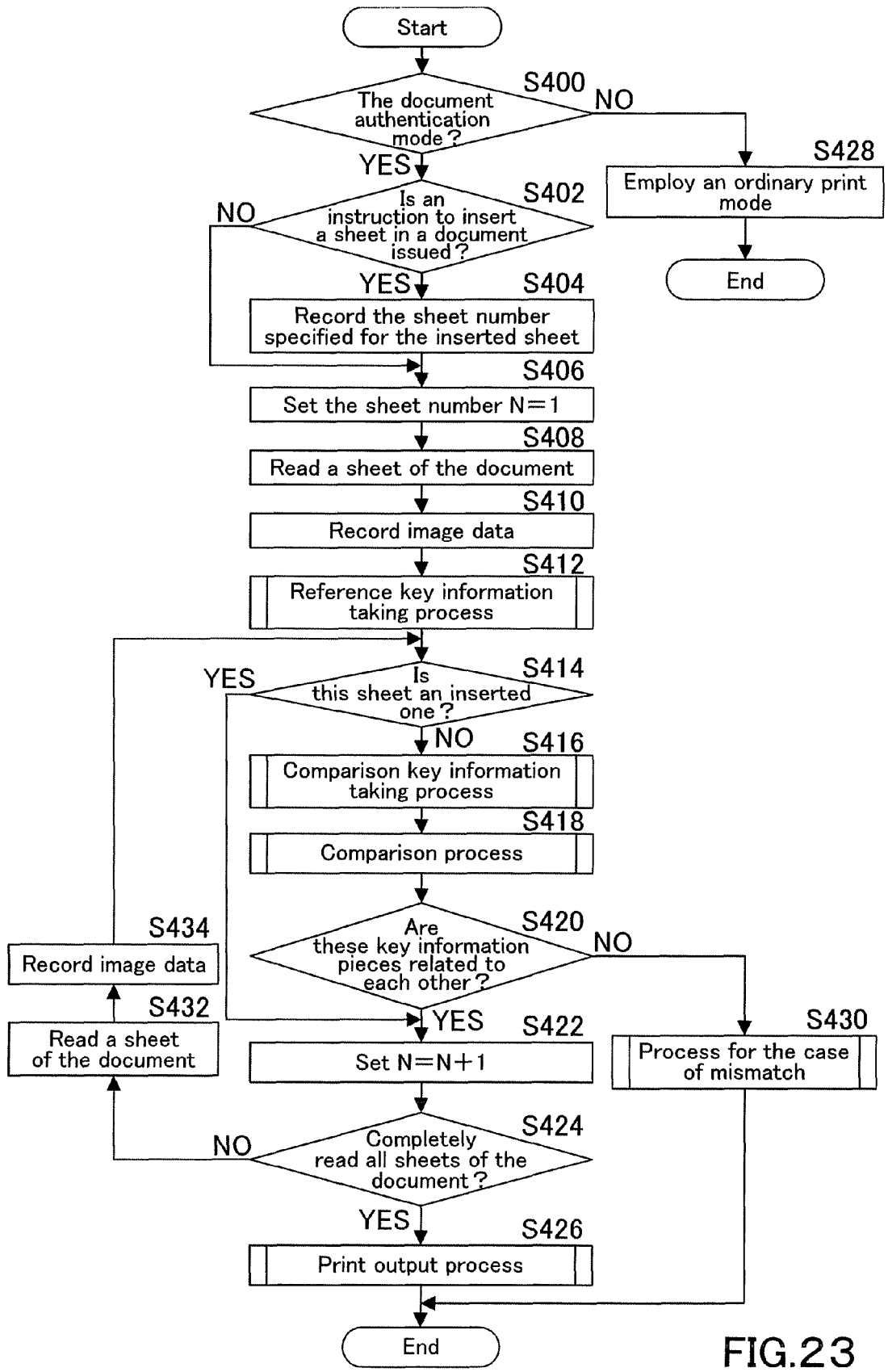
FIG. 23 is a flowchart representing a procedure executed in the image processing apparatus to check the authenticity of a document, according to the embodiment of FIG. 22.

FIG. 22 through FIG. 24 show further still yet another embodiment of the present invention. In this embodiment, the authenticity of a document is checked if reference key information pieces to be compared to comparison key information pieces from one pair to another, are collectively embedded on a cover sheet of the document, as explained with FIG. 17, and an inserted sheet M4 is inserted between Sheet 3 and Sheet 4. In this case, the sheet having been Sheet 4 will turn to be Sheet 5 that is a fifth sheet M5 and the sheet having been Sheet 5 will turn to be Sheet 6 that is a sixth sheet M6.

FIG. 23 is a flowchart representing a procedure executed in the image processing apparatus 1, to check the authenticity of a document if reference key information pieces to be compared to comparison key information pieces from one pair to another, are collectively embedded on a cover sheet of the document and an inserted sheet is inserted in the document, as shown in FIG. 22.

Initially, in Step S400, it is judged whether or not the document authentication mode is set on the image processing apparatus 1.

If the document authentication mode is not set thereon (NO in Step S400), an ordinary print mode is employed in Step S428.

If the document authentication mode is set thereon (YES in Step S400), then it is judged in Step S402 whether or not an instruction to insert a sheet in a document is issued by user via the operation panel 17. If such an instruction is issued (YES in Step S402), the sheet number specified for the inserted sheet is recorded in Step S404, then the routine proceeds to Step S406. If an instruction to insert a sheet in a document is not issued (NO in Step S402), the routine proceeds directly to Step S406.

In Step S406, a parameter N indicating the sheet number is set to "1". Then, both sides of a sheet of the document are read at the same time by the scanner 14 in Step S408, and image data read out from the sheet is recorded in the memory 15 or etc. in Step S410.

Subsequently, a reference key information taking process is performed in Step S412, and it is judged in Step S414 whether or not the sheet is an inserted one. If it is not an inserted sheet (NO in Step S414), a comparison key information taking process is performed in Step S416, and a comparison process is performed in Step S418.

Then in Step S420, according to the comparison result, it is judged whether or not a reference key information piece and a comparison key information piece are related to each other. If these are related to each other (YES in Step S420), the routine proceeds to Step S422. Meanwhile in Step S414, if the sheet is an inserted one (YES in Step S414), the routine proceeds directly to Step S422. Thus, the comparison process and etc. are not performed about the inserted sheet.

In Step S422, "1" is added to the parameter N. Then, it is judged in Step S424 whether or not all sheets of the document are completely read.

If all the sheets are not completely read (NO in Step S424), a following sheet of the document is read in Step S432, and obtained image data is recorded in Step S434. Since the reference key information pieces are already detected from the cover sheet, the routine goes back to Step S414 and repeats Steps S414 through S420 until all the sheets are completely read. If all the sheets are completely read (YES in Step S424), a print output process is performed in Step S426, then the routine terminates.

Meanwhile in Step S420, if a reference key information piece and a comparison key information piece are not related to each other (NO in Step S420), a process for the case of mismatch is performed in Step S430, then the routine terminates.

Figure 24A:
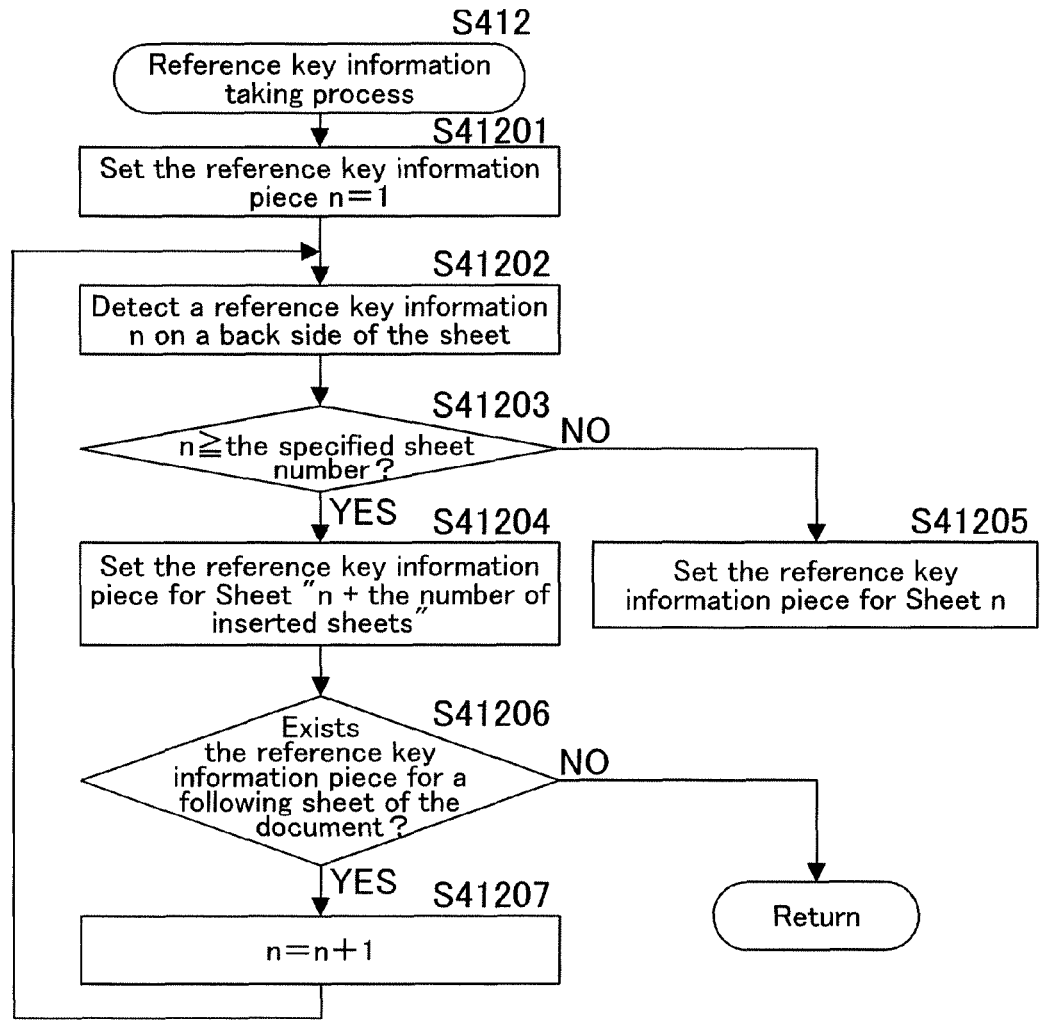
FIG. 24 shows flowcharts representing subroutines that correspond to a reference key information taking process in Step S412 of FIG. 23 and a comparison key information taking process in Step S416 of FIG. 23.
Figure 24B:
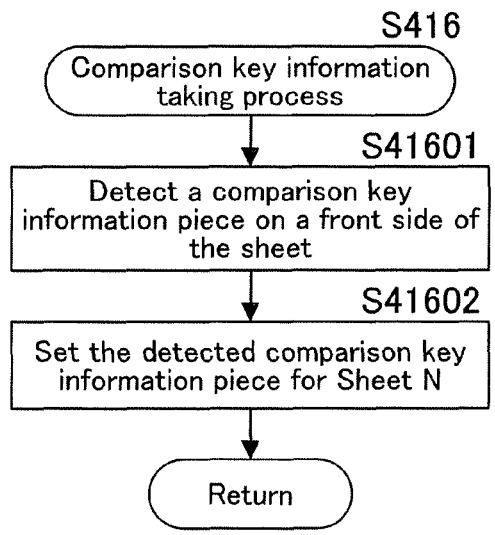

FIG. 24(A) and FIG. 24(B) are flowcharts representing subroutines that correspond to the reference key information taking process in Step S412 of FIG. 23 and the comparison key information taking process in Step S416 of FIG. 23, respectively.

As for the reference key information taking process shown in FIG. 24(A), a parameter n indicating the reference key information number is set to "1". And a first reference key information piece on a back side of the sheet is detected in Step S41202, then it is judged in Step S41203 whether or not the sheet number of a second sheet is the same as or greater than the specified sheet number (this is the sheet number specified for the inserted sheet, and the specified sheet number is "4" in the example of FIG. 22) of the inserted sheet.

If it is the same as or greater than the specified sheet number of the inserted sheet (YES in Step S41203), the detected reference key information piece is set as the reference key information piece for Sheet (n+the number of inserted sheets), in Step S41204, then the routine proceeds to Step S41206. Thus, the sheet numbers disordered due to sheet insertion are corrected. If the sheet number of Sheet n is not the same as or greater than the specified sheet number of the inserted sheet (NO in Step S41203), the detected reference key information piece is set as the reference key information piece for Sheet n, in Step S41205, then the routine proceeds to Step S41206.

In Step S41206, it is judged whether or not there exists the reference key information piece for a following sheet of the document. If there exists (YES in Step S41206), "1" is added to the parameter n in Step S41207. Then the routine goes back to Step S41202 and repeats Steps S41202 through S41207 until there does not exist the reference key information piece for a following sheet of the document.

If there does not exist the reference key information piece for a following sheet of the document (NO in Step S41206), the routine returns. In this way, the detected reference key information pieces are preliminarily set as the reference key information pieces for the first sheet M1 through the last sheet M6 excluding the inserted sheet, respectively.

As for the comparison key information taking process shown in FIG. 24(B), initially, a comparison key information piece on a front side of the sheet is detected in Step S41601. After that, the detected comparison key information piece is set as the comparison key information piece for Sheet N, in Step S41602.

The comparison process in Step S418 of FIG. 23, the print output process in Step S426 of FIG. 23 and the process for the case of mismatch in Step S430 of FIG. 23 are exactly the same as the comparison process (Step S112), the print output process (Step S120) and the process for the case of mismatch (Step S124) explained with FIG. 8 through FIG. 10, respectively. Therefore, explanation thereof is omitted.

As described above in this embodiment, even if a sheet not having a reference key information piece and a comparison key information piece embedded thereon is inserted in a document having a plurality of sheets, unfavorable effects caused by sheet insertion are prevented, and thus the authenticity of the document is properly checked.

Figure 25:
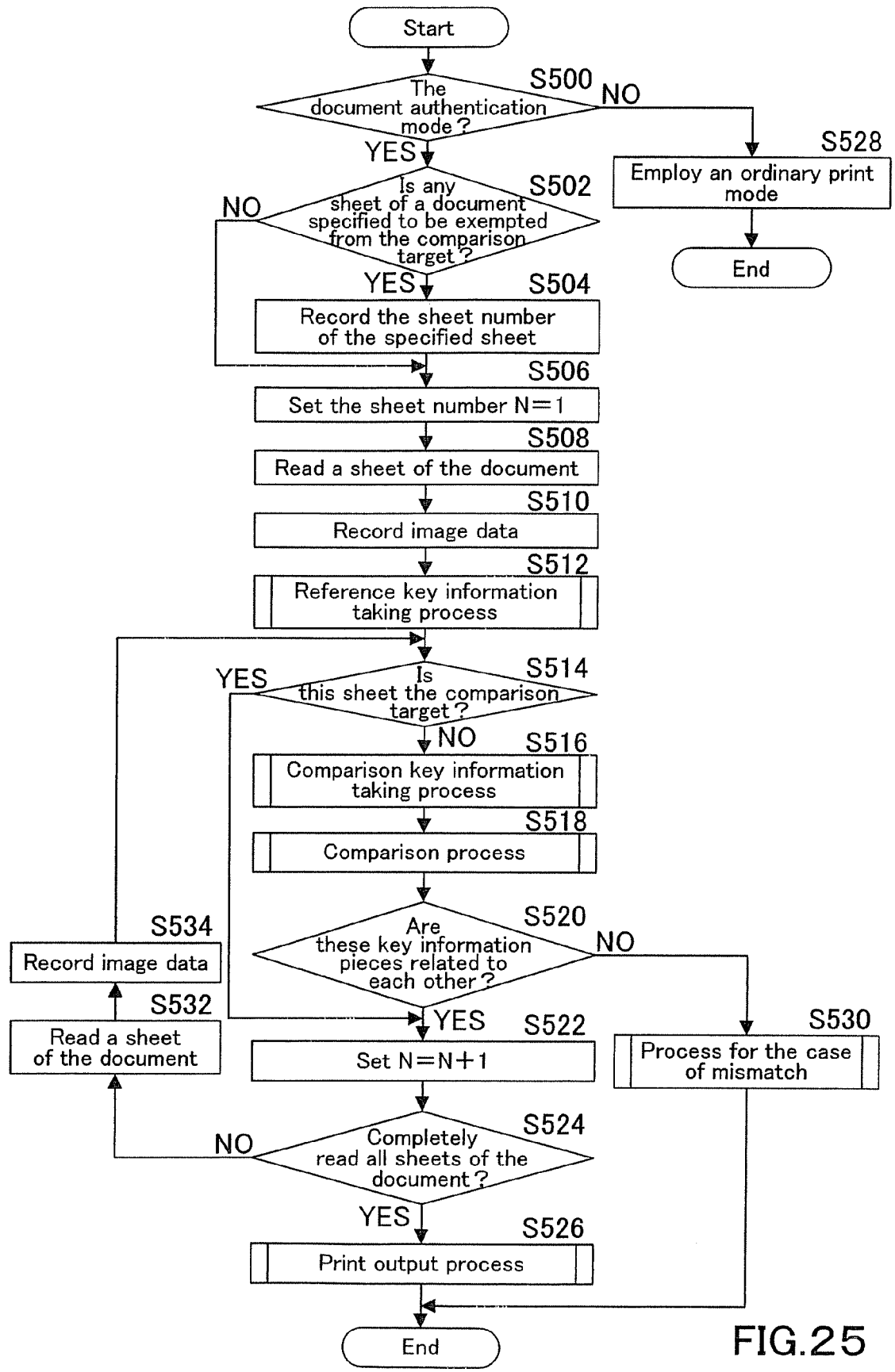
FIG. 25 is further still yet another embodiment of the present invention and shows a flowchart representing a procedure executed to check the authenticity of a document, if reference key information pieces to be compared to comparison key information pieces from one pair to another, are collectively embedded on a cover sheet of the document, as explained with FIG. 17, and a sheet of the document is specified to be exempted from the comparison target.

FIG. 25 shows further still yet another embodiment of the present invention. This is a flowchart representing a procedure executed to check the authenticity of a document, if reference key information pieces to be compared to comparison key information pieces from one pair to another, are collectively embedded on a cover sheet of the document, as explained with FIG. 17, and a sheet of the document is specified to be exempted from the comparison target.

Initially, it is judged in Step S500 whether or not the document authentication mode is set on the image processing apparatus 1.

If the document authentication mode is not set thereon (NO in Step S500), an ordinary print mode is employed in Step S528.

If the document authentication mode is set thereon (YES in Step S500), then it is judged in Step S502 whether or not any sheet of a document is specified by user via the operation panel 17, to be exempted from the comparison target. If one sheet is specified (YES in Step S502), the sheet number of the sheet specified to be exempted from the comparison target is recorded in Step S504, then the routine proceeds to Step S506. If no sheet is specified (NO in Step S502), the routine proceeds directly to Step S506.

In Step S506, a parameter N indicating the sheet number is set to "1". After that, both sides of a sheet of the document are read at the same time by the scanner 14 in Step S508, and image data read out from the sheet is recorded in the memory 15 or etc. in Step S510.

Subsequently, a reference key information taking process is performed in Step S512, and it is judged in Step S514 whether or not the sheet is the comparison target. If it is the comparison target (YES in Step S514), a comparison key information taking process is performed in Step S516, and a comparison process is performed in Step S518.

Then in Step S520, according to the comparison result, it is judged whether or not a reference key information piece and a comparison key information piece are related to each other. If these are related to each other (YES in Step S520), the routine proceeds to Step S522. If the sheet is not the comparison target (NO in Step S514), the routine proceeds directly to Step S522. Thus, the comparison process and etc. are not performed about the sheet exempted from the comparison target.

In Step S522, "1" is added to the parameter N. Then, it is judged in Step S524 whether or not all sheets of the document are completely read.

If all the sheets are not completely read (NO in Step S524), a following sheet of the document is read in Step S532, and obtained image data is recorded in Step S534. Since the reference key information pieces are already detected from the cover sheet, the routine goes back to Step S514 and repeats Steps S514 through S520 until all the sheets are completely read. If all the sheets are completely read (YES in Step S524), a print output process is performed in Step S526, then the routine terminates.

Meanwhile in Step S520, if a reference key information piece and a comparison key information piece are not related to each other (NO in Step S520), a process for the case of mismatch is performed in Step S530, then the routine terminates.

The reference key information taking process in Step S512 of FIG. 25 and the comparison key information taking process in Step S516 of FIG. 25 are exactly the same as the reference key information taking process and comparison key information taking process explained with FIG. 19, respectively. And the comparison process in Step S518, the print output process in Step S526 and the process for the case of mismatch in Step S530 are exactly the same as the comparison process (Step S112), the print output process (Step S120) and the process for the case of mismatch (Step S124) explained with FIG. 8 through FIG. 10, respectively. Therefore, explanation thereof is omitted.

As described above in this embodiment, if reference key information pieces to be compared to comparison key information pieces from one pair to another, are collectively embedded on a cover sheet of a document and a sheet of the document is specified to be exempted from the comparison target, a comparison process and etc. are automatically skipped about the specified sheet.

Figure 26:
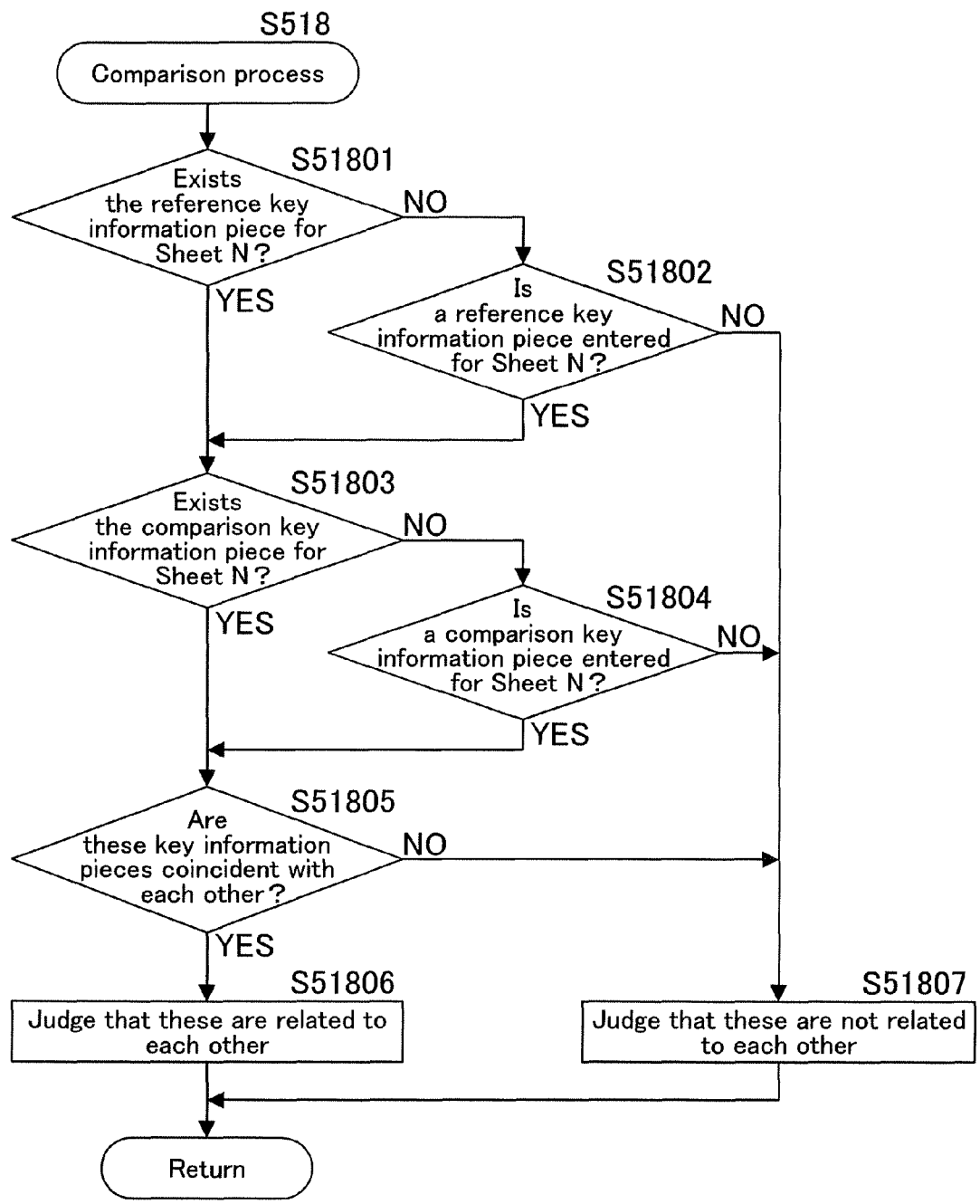
FIG. 26 is further still yet another embodiment of the present invention and shows a flowchart representing a subroutine that corresponds to a comparison process performed based on a reference key information piece or a comparison key information piece entered by user via an operation panel.

FIG. 26 shows further still yet another embodiment of the present invention. In this embodiment, if a reference key information piece or a comparison key information piece is not detected from a sheet of a document, a comparison process is performed based on a reference key information piece or a comparison key information piece entered by user via the operation panel 17.

A flowchart shown in FIG. 26 represents subroutines corresponding to the comparison processes of FIG. 6, FIG. 18, FIG. 20 and FIG. 23.

In Step S51801, it is judged whether or not there exists the reference key information piece for Sheet N. If there exists (YES in Step S51801), the routine proceeds to Step S51803. If there does not exist (NO in Step S51801), then it is judged in Step S51802 whether or not a reference key information piece is entered for Sheet N.

If it is entered (YES in Step S51802), the routine proceeds to Step S51803. If it is not entered (NO in Step S51802), then it is judged that those key information pieces are not related to each other, in Step S51807.

In Step S51803, it is judged whether or not there exists the comparison key information piece for Sheet N. If there exists (YES in Step S51803), the routine proceeds to Step S51805. If there does not exist (NO in Step S51803), then it is judged in Step S51804 whether or not a comparison key information piece is entered for Sheet N.

If it is entered (YES in Step S51804), the routine proceeds to Step S51805. If it is not entered (NO in Step S51804), then it is judged that those key information pieces are not related to each other, in Step S51807.

Figure 27:
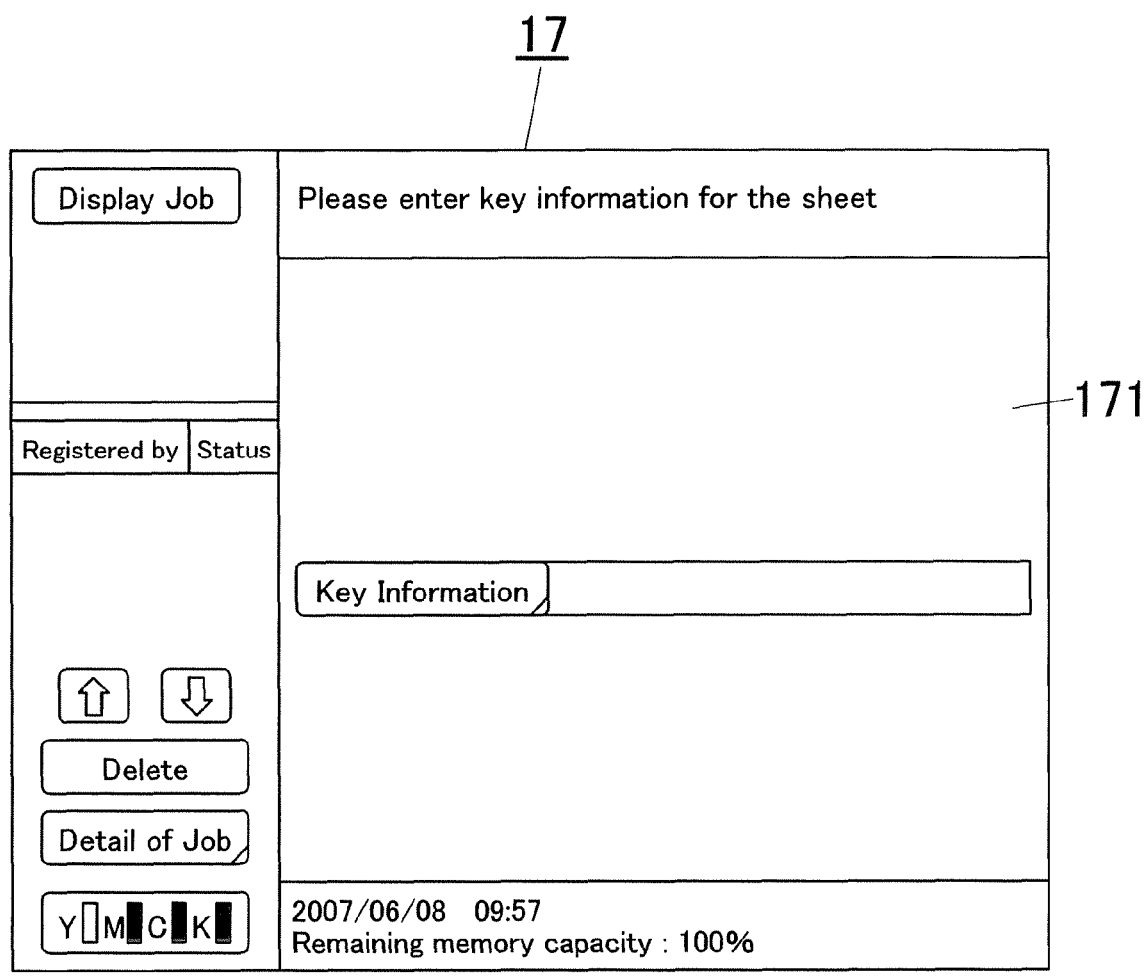
FIG. 27 is a view representing an entry screen via which a reference key information piece or a comparison key information piece is entered by user.

Entry of a reference key information piece or a comparison key information piece is performed by user via a display 171 of the operation panel 17 shown in FIG. 27.

In Step S51805, it is judged whether or not the reference key information and the comparison key information for Sheet N are coincident with each other.

If these are coincident with each other (YES in Step S51805), then it is judged that the reference key information piece and the comparison key information piece are related to each other, in Step S51806. If the reference key information piece and the comparison key information piece for Sheet N are not coincident with each other (NO in Step S51805), then it is judged that these are not related to each other, in Step S51807.

As described above in this embodiment, if a reference key information piece or a comparison key information piece is not embedded on a sheet of a document, it can be entered by user. Therefore, a relativity judgment of these key information pieces is properly performed by comparing these to each other.

The image processing apparatus explained with FIG. 1 through FIG. 4 has the function to create an original document having a reference key information piece and a comparison key information piece embedded thereon, as well as the function to check the authenticity of a document by judging whether or not a reference key information piece and a comparison key information piece are related to each other.

Figure 28:
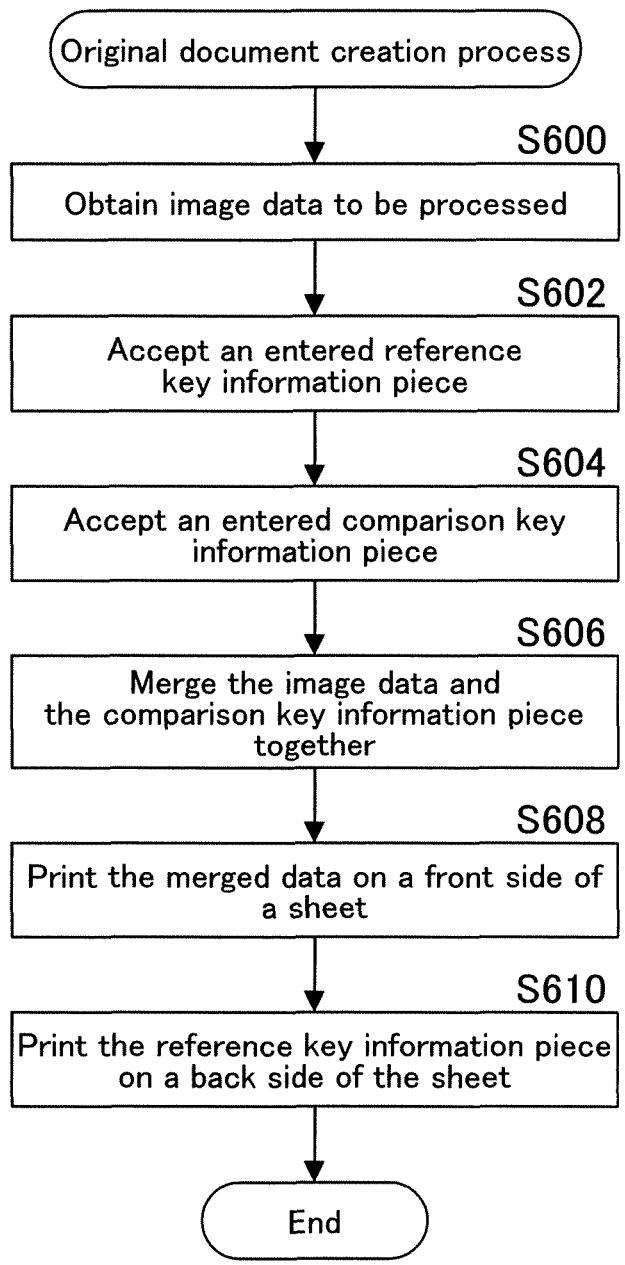
FIG. 28 is a flowchart representing a procedure executed in the image forming apparatus 1 to create an original document.

FIG. 28 is a flowchart representing a procedure executed in the image processing apparatus 1, to create an original document. This original document creation procedure is executed by the CPU 11 of the image processing apparatus 1 according to a program recorded in a recording medium such as the ROM 12.

In Step S600, image data to be printed on a sheet is obtained. Image data may be read out by the scanner 14 and may be selected among those preliminarily recorded in the memory 15.

Then, an entered reference key information piece is accepted in Step S602, and an entered comparison key information piece is accepted in Step S604. These key information pieces may be entered via the display 171 of the operation panel 17 shown in FIG. 27 and may be selected among those preliminarily recorded in the memory 15.

Subsequently, the obtained image data and the entered comparison key information piece are merged together in Step S606, and the merged data is printed on a front side of a sheet in Step S608, and then the reference key information piece is printed on a back side of the sheet in Step S610. Thus, an original document is created.

If a document consists of a plurality of sheets, this procedure above is repeatedly executed.

Each of those described above is one embodiment of the present invention, but does not limit the scope of the present invention. For example, if it is judged about one sheet of a document that a reference key information piece and a comparison key information piece are not related to each other, the printer 16 may be prohibited from outputting image data read out from this sheet, meanwhile, if it is judged about one sheet of a document that these are related to each other, the printer 16 may be permitted to output image data read out from this sheet.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
a reader that reads an image on a document;
an output portion that outputs image data read out from the document by the reader;
a detector that detects a plurality of first key information pieces collectively embedded on one side of one sheet of the document from which image data is read out by the reader, and a second key information piece to be compared to the first key information piece;
wherein the second key information piece is embedded on the other side thereof or on another sheet of the document;
a comparator that compares the plurality of first key information pieces and the second key information piece detected by the detector, and judges whether or not one of the plurality of first key information pieces and the second key information piece are coincident to each other;
wherein when the comparator judges the one of the plurality of first key information pieces and the second key information piece are coincident to each other, the comparator determines that the one of the plurality of first key information pieces and the second key information piece are related to each other; and
a controller that permits the output portion to output image data read out from all relativity judgment target sheets of the document, if the comparator determines about all these respective sheets that the one of the plurality of first key information pieces and the second key information piece are related to each other, and prohibits the output portion from outputting image data read out from at least one sheet of the document, if the comparator determines that the one of the plurality of first key information pieces embedded on the at least one sheet of the document and the second key information piece to be compared to the plurality of first key information pieces are not related to each other.

2. The image processing apparatus recited in claim 1, wherein the plurality of first key information pieces is embedded on one side of a sheet of the document and the second key information piece is embedded on the other side of a following sheet of the document.

3. The image processing apparatus recited in claim 1, wherein:
the reader is capable of reading at the same time both front and back sides of a sheet of the document, and
the comparator determines whether or not the one of the plurality of first key information pieces and the second key information piece detected by the detector are related to each other, also based on the locations on a sheet of the document where those key information pieces are embedded and the timings of detecting those key information pieces, and if at least either the locations or the timings are not the same, the comparator determines that the one of the plurality of first key information pieces and the second key information piece are not related to each other.

4. The image processing apparatus recited in claim 1, wherein the controller stops the reader from reading the document, if the detector does not detect at least either the plurality of first key information pieces or the second key information piece.

5. The image processing apparatus recited in claim 4, wherein the controller discards image data having been so far read out from the document and prohibits the output portion from outputting the image data, if the reader is stopped from reading the document.

6. The image processing apparatus recited in claim 4, wherein the controller permits the output portion to output image data having been so far read out from the document, if the reader is stopped from reading the document.

7. The image processing apparatus recited in claim 1, wherein the controller stops the reader from reading the document, if the plurality of first key information pieces to be compared to the second key information piece is not embedded.

8. The image processing apparatus recited in claim 7, wherein the controller discards image data having been so far read out from the document and prohibits the output portion from outputting the image data, if the reader is stopped from reading the document.

9. The image processing apparatus recited in claim 7, wherein the controller permits the output portion to output image data having been read out from the document, if the reader is stopped from reading the document.

10. The image processing apparatus recited in claim 1, wherein the controller stops the reader from reading the document, if it is determined that the plurality of first key information pieces and the second key information piece are not related to each other.

11. The image processing apparatus recited in claim 1, wherein the controller prohibits the output portion from outputting the image data read out from the document, as long as no permission is granted to output the image data by the output portion, even if it is determined that the plurality of first key information pieces and the second key information piece are related to each other.

12. The image processing apparatus recited in claim 11, wherein it is judged whether or not permission is granted to output the image data, based on the type of authorization or the number of allowed sheets that is granted to a user trying to output the image data.

13. The image processing apparatus recited in claim 11, wherein it is judged whether or not permission is granted to output the image data, according to whether or not a permission instruction is issued by user before reading the document.

14. The image processing apparatus recited in claim 11, wherein it is judged whether or not permission is granted to output the image data, according to whether or not output permission information embedded on at least one sheet of the document is detected.

15. The image processing apparatus recited in claim 1, further comprising:
a specifier that is used by user to specify a sheet of the document, to be exempted from the relativity judgment target, and
wherein:
if a sheet of the document is specified to be exempted from the relativity judgment target, by using the specifier, the comparator exempts the specified sheet from the relativity judgment target in order to skip judging about the specified sheet whether or not the first key information piece and the second key information piece are related to each other.

16. The image processing apparatus recited in claim 1, further comprising:
an specifier that is used by user to specify a sheet to be inserted in the document, wherein:
if a sheet is specified to be inserted in the document, by using the specifier, the reader reads the specified sheet, meanwhile, the comparator exempts the specified sheet from the relativity judgment target in order to skip judging about the specified sheet whether or not the first key information piece and the second key information piece are related to each other.

17. The image processing apparatus recited in claim 1, further comprising:
an operation portion that is used by user to input a first key information piece or a second key information piece; and
wherein:
if there exists in the document a sheet not having a first key information piece or a second key information piece embedded thereon, the comparator compares to each other, a first or second key information piece inputted by user via the operation portion and a second or first key information piece embedded thereon, and judges about the sheet whether or not the first key information piece and the second key information piece are related to each other.

18. The image processing apparatus recited in claim 1, wherein the another sheet of the document on which the second key information piece is embedded is a sheet of the document other than the sheet directly subsequent to the sheet on which the plurality of first key information pieces is collectively embedded.

19. An image processing method comprising:
reading an image on a document;
outputting image data read out from the document;
detecting a plurality of first key information pieces collectively embedded on one side of one sheet of the document and a second key information piece to be compared to the first key information piece;
wherein the second key information pieces are individually embedded on the other side thereof or on another sheet of the document;
comparing the plurality of detected first key information pieces and second key information piece, and judging whether or not one of the plurality of first key information pieces and the second key information piece are coincident to each other;
wherein when the one of the plurality of first key information pieces and the second key information piece are judged to be coincident to each other, the one of the plurality of first key information pieces and the second key information piece are determined to be related to each other; and
permitting output of image data read out from all relativity judgment target sheets of the document, if it is determined about all these respective sheets that the one of the plurality of first key information pieces and the second key information piece are related to each other, meanwhile prohibiting output of at least one sheet of the document, if it is determined that the one of the plurality of first key information pieces embedded on the at least one sheet of the document and the second key information piece to be compared to the plurality of first key information pieces are not related to each other.

20. The image processing method recited in claim 19, wherein:
both front and back sides of a sheet of the document can be read at the same time in the reading step; and
in the judgment step, it is judged whether or not the first key information piece and the second key information piece detected in the detecting step are related to each other, also based on the locations on a sheet of the document where those key information pieces are embedded and the timings of detecting those key information pieces, and if at least either the locations or the timings are not the same, it is judged that the first key information piece and the second key information piece are not related to each other.

21. The image processing method recited in claim 19, wherein:
if a sheet of the document is specified by user to be exempted from the relativity judgment target, the specified sheet is exempted from the relativity judgment target in order to skip judging about the specified sheet whether or not the first key information piece and the second key information piece are related to each other.

22. The image processing method recited in claim 19, wherein:
if the second key information pieces to be compared to the first key information pieces from one pair to another are collectively embedded on a cover sheet of the document and a sheet is specified by user to be inserted in the document, the specified sheet is read in the reading step, meanwhile, the specified sheet is exempted from the relativity judgment target in the comparison step, in order to skip judging about the specified sheet whether or not the first key information piece and the second key information piece are related to each other.

23. The image processing method recited in claim 19, wherein:
if there exists in the document a sheet not having the first key information piece or the second key information piece embedded thereon, then in the comparison step, a first or second key information piece inputted by user and a second or first key information piece embedded thereon are compared to each other and it is judged about the sheet whether or not the first key information piece and the second key information piece are related to each other.

24. A non-transitory computer readable recording medium having an image processing program recorded therein to make a computer of an image processing apparatus execute:

reading an image on a document;

outputting image data read out from the document;

detecting a plurality of first key information pieces collectively embedded on one side of one sheet of the document and a second key information piece to be compared to the first key information piece;

wherein the second key information pieces are each embedded on the other side thereof or on another sheet of the document;

comparing the plurality of detected first key information pieces and second key information piece, and judging whether or not one of the plurality of first key information pieces and the second key information piece are coincident to each other;

wherein when the one of the plurality of first key information pieces and the second key information piece are judged to be coincident to each other, the one of the plurality of first key information pieces and the second key information piece are determined to be related to each other; and permitting output of image data read out from all relativity judgment target sheets of the document, if it is determined about all these respective sheets that the one of the plurality of first key information pieces and the second key information piece are related to each other, meanwhile prohibiting output of at least one sheet of the document, if it is determines that the one of the plurality of first key information pieces embedded on the at least one sheet of the document and the second key information piece to be compared to the plurality of first key information pieces are not related to each other.

* * * * *